US009082358B2

(12) United States Patent
Yasue et al.

(10) Patent No.: US 9,082,358 B2
(45) Date of Patent: Jul. 14, 2015

(54) LIQUID CRYSTAL DRIVING DEVICE, LIQUID CRYSTAL DISPLAY APPARATUS, ELECTRONIC APPARATUS AND LIQUID CRYSTAL DRIVING METHOD

(75) Inventors: Tadashi Yasue, Chino (JP); Norichika Muraki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 87 days.

(21) Appl. No.: 13/211,636

(22) Filed: Aug. 17, 2011

(65) Prior Publication Data

US 2012/0044238 A1 Feb. 23, 2012

(30) Foreign Application Priority Data

Aug. 19, 2010 (JP) ................................ 2010-183719

(51) Int. Cl.

*G06F 3/038* (2013.01)
*G09G 5/00* (2006.01)
*G09G 3/36* (2006.01)

(52) U.S. Cl.

CPC ............ *G09G 3/3625* (2013.01); *G09G 3/3614* (2013.01); *G09G 2310/0224* (2013.01); *G09G 2320/0209* (2013.01)

(58) Field of Classification Search

None
See application file for complete search history.

(56) References Cited

U.S. PATENT DOCUMENTS

| | | | | |
|---|---|---|---|---|
| 5,233,447 | A | 8/1993 | Kuribayashi et al. | |
| 5,615,027 | A | 3/1997 | Kuribayashi et al. | |
| 6,061,045 | A | 5/2000 | Inaba | |
| 2001/0026260 | A1 | 10/2001 | Yoneda et al. | |
| 2002/0097209 | A1 * | 7/2002 | Takahashi et al. | 345/87 |
| 2003/0043105 | A1 * | 3/2003 | Hirakata | 345/96 |
| 2004/0056854 | A1 | 3/2004 | Kondo et al. | |
| 2005/0057583 | A1 | 3/2005 | Iisaka | |
| 2005/0110739 | A1 * | 5/2005 | Kwon | 345/100 |
| 2006/0007094 | A1 * | 1/2006 | Kang et al. | 345/98 |
| 2007/0075956 | A1 * | 4/2007 | Satou et al. | 345/98 |
| 2010/0026617 | A1 * | 2/2010 | Su et al. | 345/98 |

FOREIGN PATENT DOCUMENTS

| | | |
|---|---|---|
| JP | H01-113794 A | 5/1989 |
| JP | H02-126224 A | 5/1990 |
| JP | A-5-289055 | 11/1993 |
| JP | A-7-261148 | 10/1995 |
| JP | A-9-5708 | 1/1997 |
| JP | A-2000-20032 | 1/2000 |
| JP | A-2001-282203 | 10/2001 |
| JP | A-2004-29538 | 1/2004 |
| JP | A-2004-354602 | 12/2004 |
| JP | 2005-092181 A | 4/2005 |
| JP | A-2010-39464 | 2/2010 |
| JP | A-2012-53117 | 3/2012 |

* cited by examiner

*Primary Examiner* — Alexander Eisen
*Assistant Examiner* — Nan-Ying Yang
(74) *Attorney, Agent, or Firm* — Oliff PLC

(57) ABSTRACT

There is disclosed a liquid crystal driving device which improves crosstalk using the function of adjusting an interlaced line number of common electrodes and the function of adjusting a polarity reversion line number.

13 Claims, 19 Drawing Sheets

| | 1f | 2f | 3f | 4f |
|---|---|---|---|---|
| F1 | H | H | L | L |
| F2 | H | L | H | L |
| FIRST LINE | V3 | V3 | MV3 | V3 |
| SECOND LINE | V3 | MV3 | V3 | V3 |
| THIRD LINE | MV3 | V3 | V3 | V3 |
| FOURTH LINE | V3 | V3 | V3 | MV3 |

FIG. 10

| COMMON ADDRESS | LINE SEQUENTIAL SCANNING | INTERLACE SCANNING |
|---|---|---|
| 0 | 1 | 1 |
| 1 | 2 | 4 |
| 2 | (3) | 7 |
| 3 | 4 | (9) |
| 4 | 5 | 2 |
| 5 | (6) | 5 |
| 6 | 7 | 8 |
| 7 | 8 | 10 |
| 8 | (9) | (3) |
| 9 | 10 | (6) |

FIG. 12

LIQUID CRYSTAL DRIVING DEVICE, LIQUID CRYSTAL DISPLAY APPARATUS, ELECTRONIC APPARATUS AND LIQUID CRYSTAL DRIVING METHOD

The entire disclosure of Japanese Patent Application No. 2010-183719, filed Aug. 19, 2010, is expressly incorporated by reference herein.

BACKGROUND

1. Technical Field

An aspect of the present invention relates to a liquid crystal driving device, a liquid crystal display apparatus, an electronic apparatus, a liquid crystal driving method.

2. Related Art

In the related art, a liquid crystal display apparatus includes a plurality of common electrodes, and a plurality of segment electrodes which intersects with the plurality of common electrodes. A pixel is formed in a position where each common electrode and each segment electrode intersect with each other. The liquid crystal display apparatus scans the plurality of common electrodes thereof in a predetermined direction in a line sequential manner, and drives the segment electrodes at a driving voltage corresponding to image data, to thereby display an image on the liquid crystal display apparatus.

However, in a case where the common electrodes are simply scanned in the line sequential manner, crosstalk occurs in the common electrodes or the segment electrodes driven by the liquid crystal driving device, and thus, it is difficult to supply desired voltages to the common electrodes or the segment electrodes at desired timings, which causes image quality deterioration. Thus, there has been proposed a technique in which a liquid crystal display apparatus is driven in a variety of driving methods, instead of simply scanning the liquid crystal display apparatus in the line sequential manner, to prevent image quality deterioration due to a variety of causes such as crosstalk.

For example, JP-A-2010-39464 discloses a technique in which common electrodes of a liquid crystal display apparatus are scanned in either an interlace scanning mode or a progressive scanning mode. In the interlace scanning mode, the common electrodes of odd numbers are continuously scanned, and then the common electrodes of even numbers are continuously scanned. Further, JP-A-2000-20032 discloses a technique in which a pulse signal of a short interval is added to a clock signal for a scanning shift, and thus pseudo interlace scanning is realized even when wiring of a liquid crystal display apparatus has a one-sided arrangement structure. Further, JP-A-2001-282203 discloses a technique in which progressive scanning or interlace scanning in which common electrodes are scanned while being interlaced by one or plural lines can be selected.

However, an occurrence state of crosstalk is changed depending upon a displayed image. Thus, it is difficult to improve image quality even though interlace scanning is simply performed regardless of the image. Further, since crosstalk occurs between common electrodes and segment electrodes, as well as between adjacent electrodes, image quality may deteriorate due to crosstalk caused by polarity reversion driving carried out in liquid crystal driving.

In the regard, in the techniques disclosed in JP-A-2010-39464 and JP-A-2001-282203, the interlace scanning is simply performed while interlacing one or plural lines regardless of the image, and thus, it is difficult to prevent image deterioration due to crosstalk caused by polarity reversion driving carried out in liquid crystal driving. Further, in the technique disclosed in JP-A-2000-20032, since the pseudo interlace scanning is performed, if the number of interlaced lines is large, distortion of waveforms occurs, which affects image quality.

SUMMARY

An advantage of some aspects of the invention is to provide a liquid crystal driving device, a liquid crystal display apparatus, an electronic apparatus, a liquid crystal driving method and the like which can improve crosstalk due to polarity reversion driving in consideration of an image.

(1) An aspect of the invention is directed to a liquid crystal driving device which drives a passive liquid crystal display apparatus, including: a common electrode driving section which scans a common electrode of the liquid crystal display apparatus while interlacing every predetermined number of interlaced lines; a segment electrode driving section which drives a segment electrode of the liquid crystal display apparatus on the basis of image data corresponding to the common electrode scanned by the common electrode driving section; and a polarity reversion control section which performs control for reversing polarity of a voltage between the common electrode scanned by the common electrode driving section and the segment electrode driven by the segment electrode driving section, every predetermined number of polarity reversion lines.

With this configuration, when the passive liquid crystal display apparatus is driven during polarity reversion, the common electrodes of the liquid crystal display apparatus are scanned while being interlaced every predetermined number of interlaced lines. Further, the segment electrodes of the liquid crystal display apparatus are driven on the basis of the image data corresponding to the scanned common electrodes. Thus, even in a case where electric potential change of the common electrode occurs due to waveform blunting of the driving voltage of the segment electrode or electric potential change of the segment electrode during polarity reversion, according to an image, change in the scanning order is simplified, and adjustment against image quality deterioration becomes significantly easy.

(2) The liquid crystal driving device may further include an interlaced line number setting register in which a setting value corresponding to the interlaced line number is set. Here, the common electrode driving section may scan the common electrodes of the liquid crystal display apparatus while interlacing every predetermined number of interlaced lines corresponding to the setting value of the interlaced line number setting register.

With this configuration, by enabling the interlaced line number to be set, even in a case where electric potential change of the common electrode occurs due to waveform blunting of the driving voltage of the segment electrode or electric potential change of the segment electrode during polarity reversion, it is possible to perform the adjustment according to the image.

(3) The liquid crystal driving device may further include a polarity reversion line number setting register in which a setting value corresponding to the polarity reversion line number is set. Here, the common electrode driving section may scan the common electrode using a selection voltage of which the polarity is reversed every polarity reversion line number corresponding to the setting value of the polarity reversion line number setting register, and the segment electrode driving section may drive the segment electrode using a driving voltage of which the polarity is reversed every polarity reversion line number corresponding to the setting value of the polarity reversion line number setting register.

With this configuration, by enabling the polarity reversion line number to be set, even in a case where electric potential change of the common electrode occurs due to waveform blunting of the driving voltage of the segment electrode or electric potential change of the segment electrode during polarity reversion, it is possible to perform the adjustment according to the image.

(4) In the liquid crystal driving device, the common electrode driving section may scan the common electrode of the liquid crystal display apparatus, over a plurality of fields in a block unit in which a plurality of common electrodes selected at the same time belongs to one block, in a selection pattern corresponding to the respective fields; the segment electrode driving section may drive the segment electrode at a driving voltage corresponding to image data corresponding to the plurality of common electrodes selected at the same time and a driving voltage corresponding to the selection pattern; the interlaced line number may be a multiple of the number of the plurality of common electrodes selected at the same time; and the polarity reversion line number may be a multiple of the number of the plurality of common electrodes selected at the same time.

With this configuration, even in a case where the liquid crystal display apparatus is driven by an MLS (Multi Line Selection) driving method, and even in a case where electric potential change of the common electrode occurs due to waveform blunting of the driving voltage of the segment electrode or electric potential change of the segment electrode during polarity reversion, it is possible to perform the adjustment according to the image.

(5) The liquid crystal driving device may further include: a scanning counter which counts the frequency of interlace scanning; and a common address counter which counts a common address corresponding to the common electrode which is a scanning target, using the counted value of the scanning counter. Here, the common electrode driving section may scan the common electrode corresponding to the common address.

With this configuration, in addition to the above-described effects, it is possible to realize the interlace scanning with a simplified structure.

(6) Another aspect of the invention is directed to a liquid crystal display apparatus including: a plurality of common electrodes; a plurality of segment electrodes which intersects the plurality of common electrodes; and any one of the above-described liquid crystal driving devices which scans the plurality of common electrodes and drives the plurality of segment electrodes.

With this configuration, it is possible to provide a liquid crystal display apparatus which improves crosstalk caused due to polarity reversion driving according to an image.

(7) Still another aspect of the invention is directed to an electronic apparatus including the liquid crystal display apparatus as described above.

With this configuration, it is possible to provide an electronic apparatus which employs the liquid crystal display apparatus which improves crosstalk caused due to polarity reversion driving according to an image.

(8) Yet still another aspect of the invention is directed to a liquid crystal driving method of driving a passive liquid crystal display apparatus, including: scanning a common electrode of the liquid crystal display apparatus while interlacing every predetermined number of interlaced lines; driving a segment electrode of the liquid crystal display apparatus on the basis of image data corresponding to the common electrode scanned by the common electrode driving section; and performing control for reversing polarity of a voltage between the common electrode scanned by the common electrode driving section and the segment electrode driven by the segment electrode driving section, every predetermined number of polarity reversion lines.

BRIEF DESCRIPTION OF THE DRAWINGS

The invention will be described with reference to the accompanying drawings, wherein like numbers reference like elements.

FIG. 10 is a diagram illustrating an example of a selection pattern when an MLS driving method is performed.

FIG. 12 is a diagram illustrating interlace scanning according to the present embodiment.

DESCRIPTION OF EXEMPLARY EMBODIMENTS

Hereinafter, embodiments of the present disclosure will be described in detail with reference to the accompanying drawings. The embodiments described below do not inappropriately limit the scope of the invention disclosed in claims. Further, all components described below are not essential to solve the problem of the invention.

Liquid Crystal Display Apparatus

Figure 1:
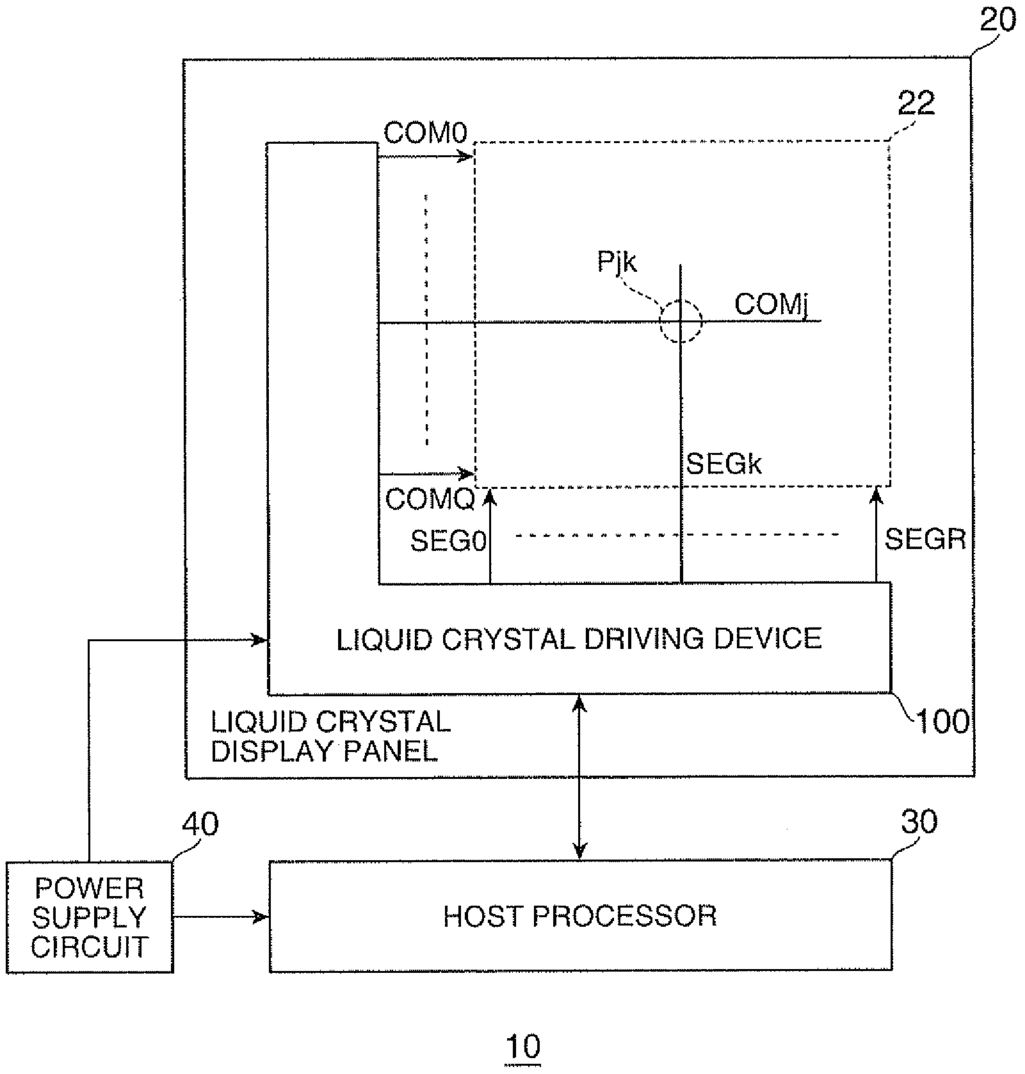
FIG. 1 is a block diagram illustrating configuration example of a liquid crystal display apparatus according to an embodiment.

FIG. 1 is a block diagram illustrating a configuration example of a liquid crystal display apparatus according to an embodiment. FIG. 1 illustrates a configuration example of the liquid crystal display apparatus which is provided with a liquid crystal driving device, in which the liquid crystal driving device may be provided outside the liquid crystal display apparatus.

A liquid crystal display system 10 includes a liquid crystal display panel (liquid crystal display apparatus in a broad sense) 20, a host processor 30, and a power supply circuit 40.

The liquid crystal display panel 20 is a positive liquid crystal display panel, and is formed by sealing a gap between a pair of transparent glass substrates with a plurality of common electrodes and a plurality of segment electrodes which are formed of transparent electrodes and intersect with each other, an alignment film, liquid crystal, and the like. The liquid crystal display panel 20 includes a pixel forming area 22. In the pixel forming area 22, a pixel is formed in an intersection position between a common electrode disposed in a first direction and a segment electrode disposed in a second direction which intersects with the first direction. FIG. 1 shows a plurality of common electrodes COMj ($0 \le j \le Q$, j is an integer) which is a plurality of common electrodes COM0 to COMQ (Q is an integer of 2 or more) and a plurality of segment electrodes SEGk ($0 \le k \le R$, k is an integer) which is a plurality of segment electrodes SEG0 to SEGR (R is an integer of 2 or more). A pixel Pjk is formed in an intersection position of the common electrode COMi and the segment electrode SEGk. On a glass substrate which forms the liquid crystal display panel 20, the liquid crystal driving device 100 is mounted in a COG (Chip On Glass) manner.

The liquid crystal driving device 100 includes a plurality of common electrode output terminals for supplying a predetermined selection voltage to the common electrodes, and a plurality of segment electrode output terminals for supplying a liquid crystal driving voltage corresponding to image data to the segment electrodes. The plurality of common electrode output terminals is electrically connected to the corresponding common electrodes, and the plurality of segment electrode output terminals is electrically connected to the corresponding segment electrodes. The liquid crystal driving device 100 drives the common electrodes COM0 to COMQ and the segment electrodes SEG0 to SEGR which are formed in the pixel forming area of the liquid crystal display panel 20 by an MLS (Multi Line Selection) driving method. That is, the liquid crystal driving device 100 simultaneously selects the plurality of common electrodes, and drives the plurality of common electrodes over a plurality of times, at a plurality of field periods obtained by dividing one frame period as a period necessary for displaying one screen. The liquid crystal driving device 100 drives the simultaneously selected plurality of common electrodes on the basis of a selection pattern (scanning pattern), and applies a driving voltage corresponding to a predetermined MLS calculation result based on the selection pattern and the image data to the plurality of segment electrodes, for each field period.

The host processor 30 reads a program stored in a built-in memory or a memory (not shown), performs a process corresponding to the program, and thus performs a driving control of the liquid crystal driving device 100. Thus, the host processor 30 controls an operation of the liquid crystal driving device 100 by setting a setting value in a setting register which is installed in the liquid crystal driving device 100. Further, the host processor 30 supplies the image data corresponding to the image to be displayed on the liquid crystal display panel 20 to the liquid crystal driving device 100. In FIG. 1, the host processor 30 may be installed on a glass substrate which forms the liquid crystal display panel 20.

The power supply circuit 40 supplies an operation power supply voltage and a driving power supply voltage of the liquid crystal display panel 20, or a reference voltage for generating these voltages to each of the host processor 30 and the liquid crystal driving device 100. In FIG. 1, the power supply circuit 40 may be mounted on a glass substrate which forms the liquid crystal display panel 20, or may be installed in the liquid crystal driving device 100.

MLS Driving Method

The MLS driving method in the liquid crystal driving device 100 can shorten an interval between periods when the common electrodes are selected, compared with a typical driving method, can suppress reduction of pixel transmittance, and can enhance average transmittance. Further, by simultaneously selecting the plurality of common electrodes, it is possible to lower a driving voltage (selection voltage) applied to the common electrodes.

FIGS. 2A to 2D are diagrams illustrating a principle of the MLS driving method. Each of FIGS. 2A to 2D represents ON or OFF examples in pixels (dots) in positions where the common electrodes COM0 and COM1 intersect with the segment electrode SEG0. In FIGS. 2A to 2D, two-line common electrodes COM0 and COM1 are simultaneously selected, and examples of two-line simultaneous selection in the MLS driving method are shown.

In FIGS. 2A to 2D, an ON pixel is expressed as "−1" and an OFF pixel is expressed as "+1", which are designated by image data indicating ON or OFF. Further, a selection pattern for selecting each of the common electrodes COM0 and COM1 is expressed as two values of "+1" and "−1". Further, the driving voltage of the segment electrode SEG0 includes three values of "MV2", "V2", and "V1".

Figure 2:
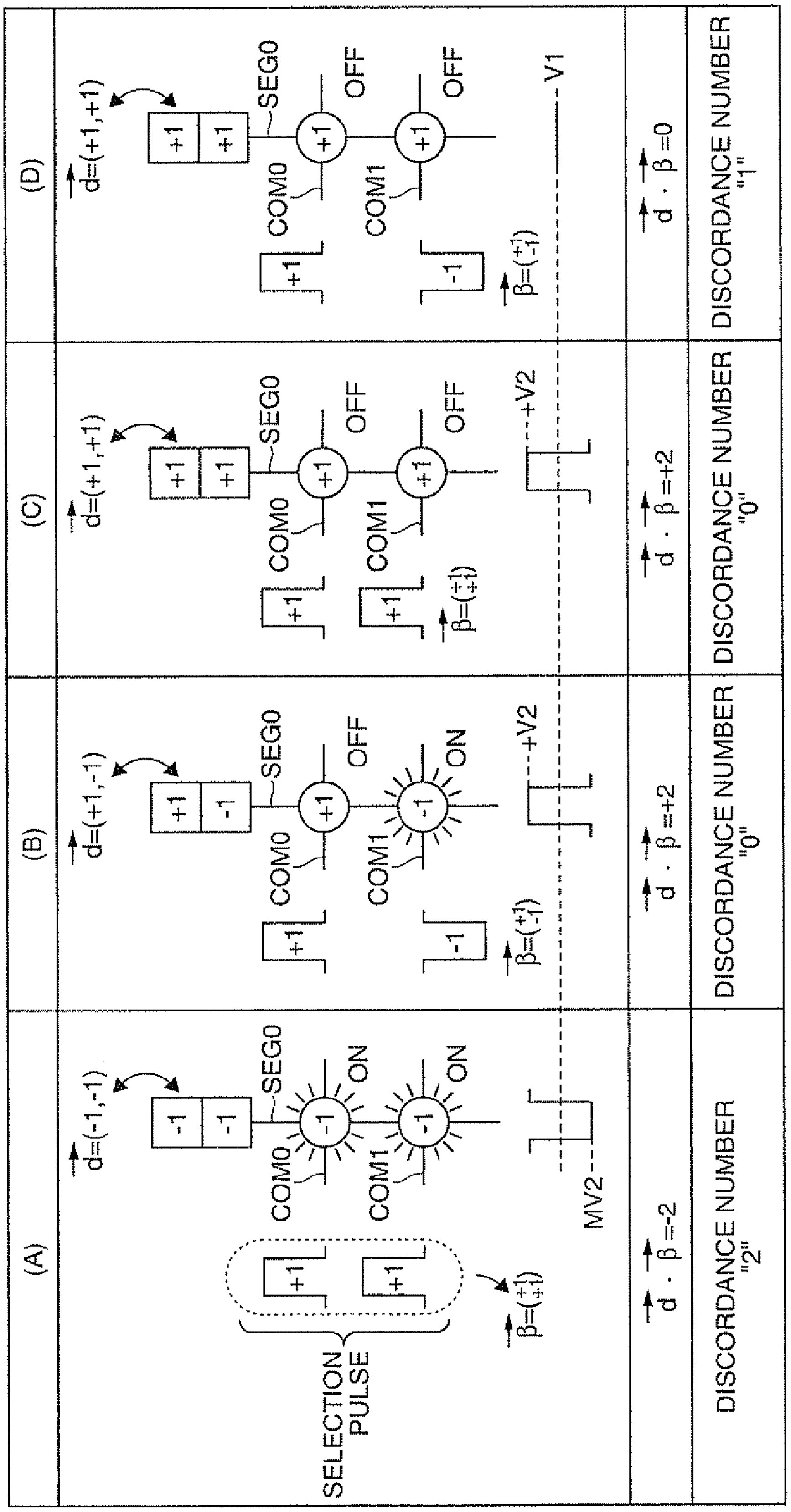
FIGS. 2A to 2D are diagrams illustrating a principle of an MLS driving method.

In the MLS driving method, the driving voltage of the segment electrode SEG0 is determined by the image data and the selection pattern of the common electrodes COM0 and COM1 which are simultaneously selected. Here, when the image data is represented as an image data vector d and a selection pattern is represented as a matrix β, the driving voltage of the segment electrode SEG0 is determined as one of the voltages of "MV2", "V2" and "V1", by the product of the image data vector d and the matrix β. The image data vector d is a vector which expresses data indicating ON or OFF of a pixel in a position where the segment electrode SEG0 intersects with each common electrode. In the case of FIG. 2A, $d \cdot \beta = -2$; in the case of FIG. 2B, $d \cdot \beta = +2$; in the case of FIG. 2C, $d \cdot \beta = +2$; and in the case of FIG. 2D, $d \cdot \beta = 0$. Further, when the product of the image data vector d and the matrix β is "−2", "MV2" is selected as the driving voltage of the segment electrode SEG0, "V2" is selected when the product "+2", and "V1" is selected when the product is "0".

For example, when the calculation of the product of the image data vector d and the matrix β is performed by hardware, the number of discordances between each data element of the image data vector d and each data element of the matrix β may be determined. For example, when the discordance number is "2", "MV2" is selected as the driving voltage of the segment electrode SEG0. Further, when the discordance number is "0", "V2" is selected as the corresponding driving voltage. Furthermore, when the discordance number is "1", "V1" is selected as the corresponding driving voltage.

In the MLS driving method of the two-line simultaneous selection, by determining the driving voltage of the segment electrode SEG0 as described above, and by providing two times of field periods within one frame period, ON or OFF of pixels is controlled. Since the plurality of field periods is provided, it is possible to reduce transmittance reduction in a non-field period, to enhance the average transmittance in the liquid crystal display panel 20, and to enhance contrast of the liquid crystal display panel 20. In this embodiment, the MLS driving method is performed in which the four-line common electrodes are simultaneously selected. In this case, it is possible to provide four field periods within one frame period, and to further enhance contrast of the liquid crystal display panel 20. In the MLS driving method of the four-line simultaneous selection, 7 levels of voltages are used.

Figure 3:
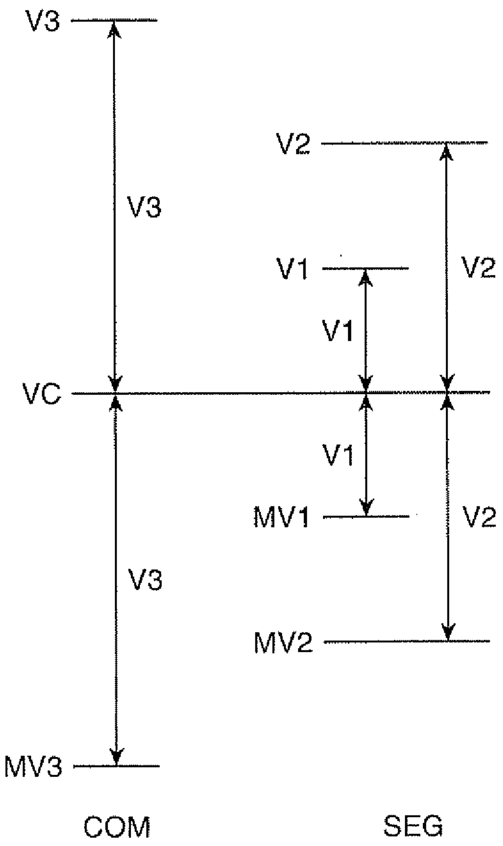
FIG. 3 is a diagram illustrating the relationship between voltages of 7 levels in four-line simultaneous selection in an MLS driving method.

FIG. 3 illustrates the relationship between 7 levels of voltages when the liquid crystal display panel 20 is driven by the MLS driving method of the four-line simultaneous selection.

Voltages V3 and MV3 are selection voltages of the common electrodes. A voltage VC is a non-selection voltage of the common electrodes, and is a driving voltage of the segment electrodes. Voltages V2, V1, MV1 and MV2 are driving voltages of the segment electrodes. Further, the pixel transmittance is changed according to a voltage difference between the common electrodes and the segment electrodes which intersect each other.

Here, a voltage difference between the voltage V3 and the center voltage VC is represented as $v_3$; a voltage difference between the voltage V2 and the center voltage VC is represented as $v_2$; and a voltage difference between the voltage V1 and the center voltage VC is represented as $v_1$. At this time, a voltage difference between the center voltage VC and the voltage MV3 is represented as $v_3$; a voltage difference between the center voltage VC and the voltage MV2 is represented as $v_2$; and a voltage difference between the center voltage VC and the voltage V1 is represented as $v_1$. Here, a voltage difference (which is equal to a voltage difference between the voltage MV1 and the voltage MV2) between the voltage V2 and the voltage V1 is the same as a voltage difference (which is equal to a voltage difference between the center voltage VC and the voltage MV1) between the voltage V1 and the center voltage VC.

Liquid Crystal Driving Device

The liquid crystal display driving device 100 drives the common electrodes and the segment electrodes using the MLS driving method using the voltages shown in FIG. 3. At this time, by performing N-line polarity reversion control for reversing the polarity whenever N (N is an integer of 1 or more) common electrodes are scanned, the liquid crystal driving device 100 prevents the liquid crystal from being deteriorated, thereby enhancing image quality. However, in the case of an image in which OFF pixels (ON pixels) are present in a part of the screen where a background is ON pixels (OFF pixels), image quality deterioration due to crosstalk is expected.

Figure 4A:
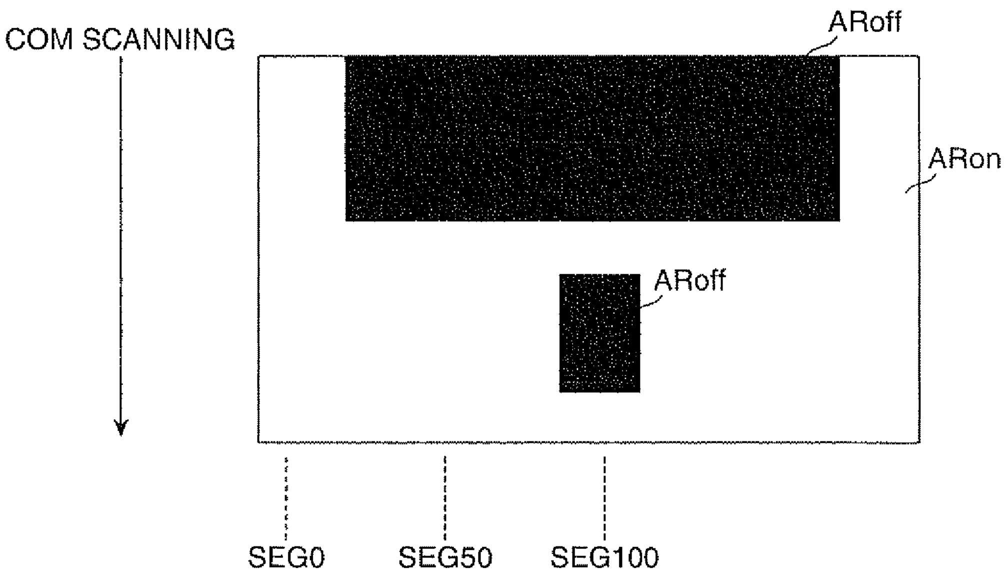
FIGS. 4A and 4B are diagrams illustrating image quality deterioration states according to the present embodiment.
Figure 4B:
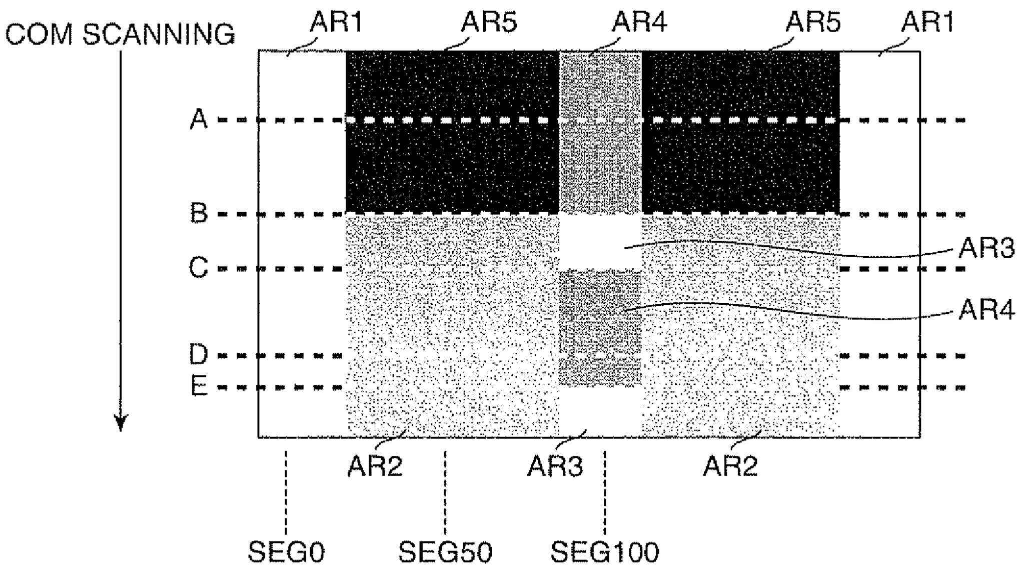

FIGS. 4A and 4B are diagrams illustrating states of image quality deterioration according to this embodiment. FIG. 4A is a diagram schematically illustrating an ideal display image, in which a black area corresponds to OFF pixels and a white area corresponds to ON pixels. FIG. 4B is a diagram schematically illustrating an actual display image, which represents image quality deterioration due to crosstalk.

That is, in FIG. 4A, it is assumed that an area ARoff of OFF pixels is present in a part of the screen in a region ARon in which the background is ON pixels. When the liquid crystal driving device 100 drives the common electrodes and the segment electrodes in a line sequential manner using the MLS driving method, on the basis of image data corresponding to the image shown in FIG. 4A, the image shown in FIG. 4B is displayed. In FIG. 43, an area AR1 is an ON area, which is displayed in a direction where pixels are further ON compared with the existing ON display. An area AR2 is also the ON area, which is displayed in a direction where pixels are OFF compared with the existing ON display. An area AR3 is also the ON area, which is displayed in a direction where pixels are OFF compared with the existing ON display but are ON compared with the area AR2. An area AR4 is the OFF area, which is displayed in a direction where pixels are ON compared with the existing OFF display. An area AR 5 is also the OFF area, which is displayed in a direction where pixels are further OFF compared with the existing OFF display.

It is considered that the phenomenon in FIG. 4B occurs due to blunted waveforms of the driving voltages of the segment electrodes and reduction in the effective voltage caused when electric potential change in the segment electrodes changes the non-selection voltage of the common electrodes. Here, in order to describe the influence of the blunted waveforms and the electric potential change during polarity reversion, in FIG. 4B, it is assumed that the polarity reversion is performed at timings A and D, the scanning is performed at timing B, C and E; and the timings A and D coincide with the scanning timings. In the present embodiment, since the electric potential change of the segment electrodes occurs at the time of the image data change and the polarity reversion, the phenomenon in FIG. 4*b* at the respective timings may be described as follows.

The polarity reversion timing A is a timing when the majority of the segment electrodes is OFF (driving voltage corresponding to image data indicating OFF), the minority thereof is ON (driving voltage corresponding to image data indicating ON), and the polarity reversion occurs. The scanning timing B is a timing when the majority of the segment electrodes is changed to ON from OFF and the minority thereof is maintained to be ON. The scanning timing C is a timing when the majority of the segment electrodes is maintained to be ON and the minority thereof is changed to OFF from ON. The polarity reversion timing D is a timing when the majority of the segment electrodes is ON, the minority thereof is OFF, and the polarity reversion occurs. The scanning timing E is a timing when the majority of the segment electrodes is maintained to be ON and the minority thereof is changed to ON from OFF.

Here, the ideal waveform of an driving voltage at each timing is as follows.

Figure 5:
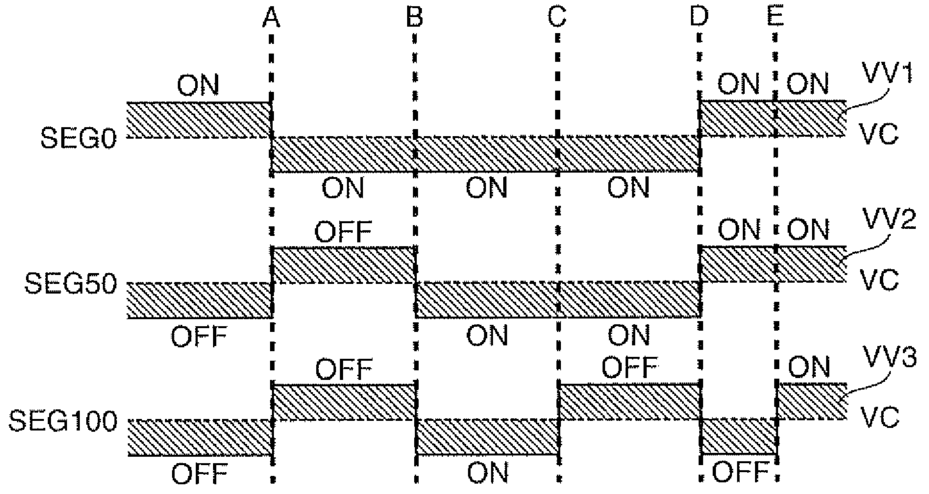
FIG. 5 is a diagram illustrating ideal waveforms of driving voltages of segment electrodes.

FIG. 5 illustrates ideal waveforms of driving voltages of segment electrodes, which shows waveforms of driving voltages of a segment electrode SEG0 in the area AR1 of FIG. 4B, a segment electrode SEG50 in the areas AR2 and AR5 of FIG. 4B, a segment electrode SEG100 in the area AR3 and AR4 of FIG. 4B.

In this case, the center voltage VC which is the non-selection voltage of the common electrode is stable, and blunting or distortion does not occur even though the electric potential is changed in each of the segment electrodes SEG0, SEG50 and SEG100. This is similarly applied to the voltage levels of the common electrodes and the voltage levels of the segment electrodes at the polarity reversion timings A and D. Accordingly, the effective voltage between each segment electrode and each common electrode corresponds to hatched portions VV1 to VV3.

However, it is considered that the waveform blunting actually occurs in the segment electrodes. The effective voltage is different from that shown in FIG. 5, by the waveform blunting.

Figure 6:
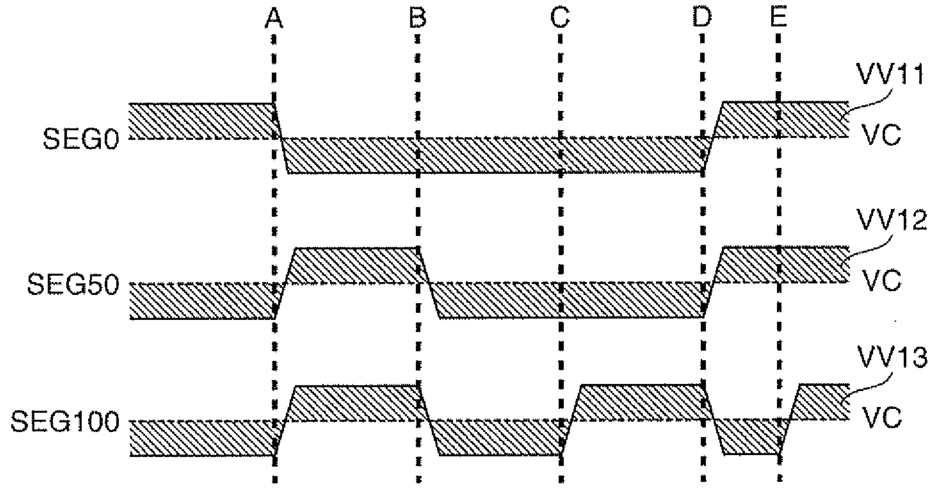
FIG. 6 is a diagram illustrating blunted waveforms of driving voltages of segment electrodes.

FIG. 6 illustrates the blunted waveforms of the driving voltages of the segment electrodes. In FIG. 6, the center voltage VC of the common electrode is stable, and the waveforms of the segment electrodes SEG0, SEG50 and SEG100 are shown with reference to the center voltage VC. In FIG. 6, the same reference numerals are given to the same portions as in FIG. 5, and detailed description thereof is omitted.

In the segment electrodes SEG0, SEG50 and SEG100, at the polarity reversion timings A and D or at the timings when ON pixels are changed to OFF pixels or OFF pixels are changed to ON pixels, the driving voltages are changed. The waveform blunting occurs by the electric potential change of the segment electrodes, and the effective voltage between the segment electrode and the common electrode becomes hatched portions VV11 to VV13, and thus the effective voltage is reduced. Thus, as the electric potential change of the segment electrodes frequently increases, the effective voltage decreases. Accordingly, the ON areas of the areas AR2 and AR3 are displayed in the direction where pixels are OFF, compared with the ON area of the area AR1 of FIG. 4B.

However, only with the waveform blunting of the driving voltages of the segment electrodes, it is difficult to clarify a contrasting density difference between the areas AR2 and AR3, or a contrasting density difference between the areas AR4 and AR5. Thus, the electric potential change in the non-selection voltage of the common electrodes due to the influence of the electric potential changes of the segment electrodes is considered.

Figure 7:
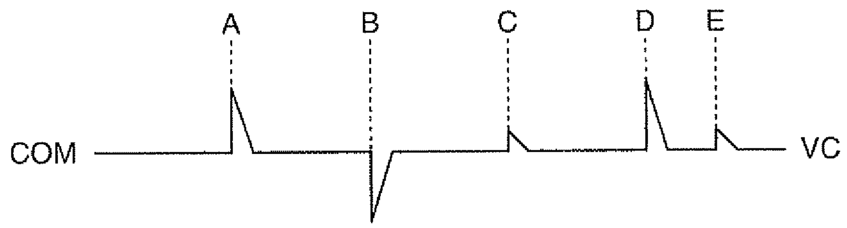
FIG. 7 is a diagram schematically illustrating distortion of a center voltage which is non-selection voltage of a common electrode.

FIG. 7 schematically illustrates distortion of the center voltage VC which is the non-selection voltage of the common electrodes, which shows a state where the electric potential level of the center voltage VC is changed at the polarity reversion timings A and D in FIG. 4B and the scanning timings B, C and E.

It is considered that the level of the influence of the electric potential change of the segment electrodes to the electric potential level of the non-selection voltage of the common electrodes depends on the image data. This is because it is considered that the levels of electric potential changes of the common electrodes are different from each other between a case where electric potentials of the segment electrodes are changed at one time by the image data and a case where only one of the electric potentials of the segment electrodes is changed. Thus, it is considered that the electric potential level of the non-selection voltage of the common electrodes is distorted in a direction where the electric potentials of the segment electrodes are changed depending on the image data. From the above considerations, the distortion significantly occurs in a positive direction at the polarity reversion timings A and D, and occurs in a negative direction at the scanning timing B. On the other hand, the distortion slightly occurs in the positive direction at the scanning timings C and E.

As described above, since the effective voltages are voltages between the common electrodes and the segment electrodes, the effective voltages are as follows, in consideration of the waveform blunting of the segment electrodes and the distortion of the center voltage level of the common electrodes.

Figure 8:
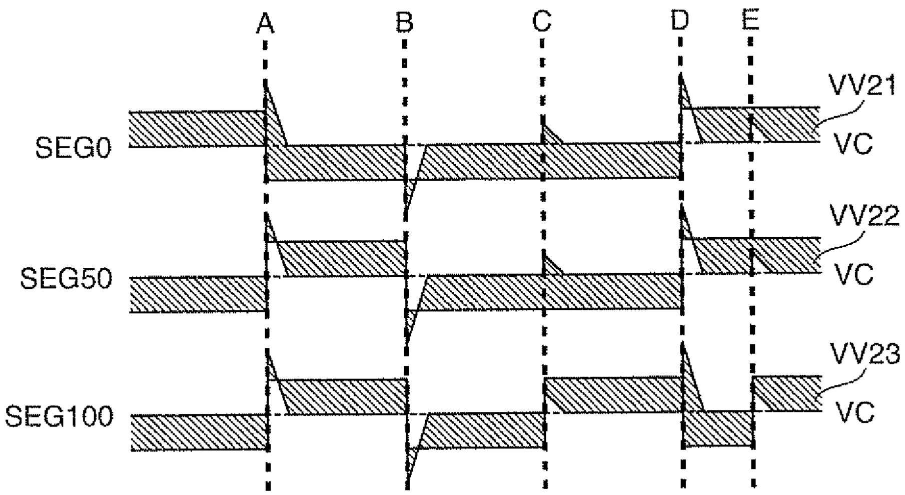
FIG. 8 is a diagram illustrating effective voltages when blunted waveforms of segment electrodes and distortion of a center voltage level of a common electrode are considered.

FIG. 8 is a diagram illustrating the effective voltages when the blunted waveforms of the segment electrodes and the distortion of the center voltage level of the common electrodes are considered. FIG. 8 is a combination of the waveforms in FIG. 6 and FIG. 7, and the same reference numerals are given to the same portions as in FIG. 6 or 7, and detailed description thereof is appropriately omitted.

In consideration of hatched portions VV21 to VV23 corresponding to the effective voltages, shown in FIG. 8, at the polarity reversion timing A, the effective voltage of the segment electrode SEG0 significantly increases compared with the effective voltages of the segment electrodes SEG50 and SEG100. At the scanning timing B, the influences of the effective voltages of the segment electrodes SEG0, SEG50 and SEG100 are approximately the same. At the scanning timing C, the effective voltage of the segment electrode SEG100 slightly decreases compared with the effective voltages of the segment electrodes SEG0, SEG50 and SEG100. At the polarity reversion timing D, the effective voltage of the segment electrode SEG100 significantly increases compared with the effective voltages of the segment electrodes SEG0 and SEG50. At the scanning timing E, the influences of the effective voltages of the segment electrodes SEG0, SEG50 and SEG100 are approximately the same.

Accordingly, the area AR1 of the segment electrode SEG0 is displayed in a direction where pixels are further ON. Further, the area AR2 of the segment electrode SEG50 and the area AR3 of the segment electrode SEG100 are ON areas, but while operating in a direction where pixels are OFF, the area AR3 is displayed in a direction where pixels are ON compared with the area AR2. Further, it can be understood that the area AR4 of the segment electrode SEG100 is the OFF area, but is displayed in a direction where pixels are ON compared with the area AR5 of the segment electrode SEG50.

As described above, when the N-line polarity reversion control is performed during simple progressive scanning, the effective voltages of the segment electrodes in the ON area become high by crosstalk of the common electrodes caused by the electric potential changes of the segment electrodes based on the polarity reversion in the ON area. In this case, there is a possibility that the phenomenon shown in FIG. 4B occurs. In order to prevent such a phenomenon, it is possible to offset a portion where the effective voltages become high due to crosstalk and a portion where the effective voltages become low due to crosstalk, by adjusting the number of polarity reversion lines. However, if the number of polarity reversion lines is small, the effective voltages in the ON area become high, and thus, there occurs crosstalk in which the upper and lower OFF areas of the ON area are displayed in a direction where pixels are ON. On the other hand, if the number of polarity reversion lines is large, flickering easily occurs. Only with such an adjustment of the number of polarity reversion lines, the image quality rather easily deteriorates, thereby making it difficult to perform the adjustment.

Thus, in this embodiment, by changing the scanning order of the common electrodes, it is easy to adjust the changes in the effective voltages due to the crosstalk. Accordingly, even with the same polarity reversion line number, by changing the scanning order of the common electrodes, it is possible to prevent image quality deterioration due to the crosstalk. At this time, by scanning the common electrodes while interlacing a predetermined number of interlaced lines, the change of the scanning order is realized with a simple configuration.

The liquid crystal driving device 100 may have the following configuration.

Figure 9:
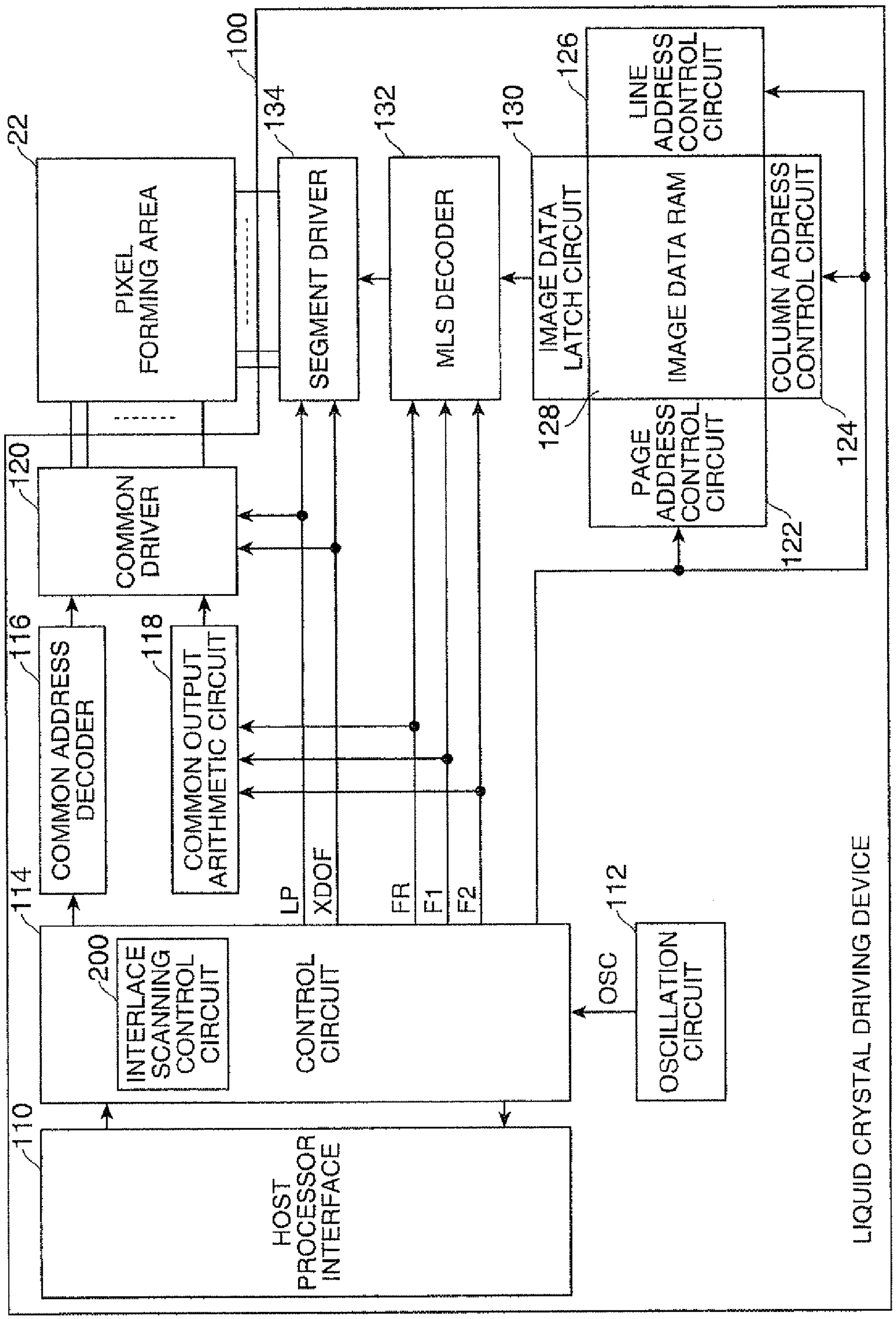
FIG. 9 is a block diagram illustrating a configuration example of a liquid crystal driving device according to the present embodiment.

FIG. 9 is a block diagram illustrating a configuration example of the liquid crystal driving device 100 according to the present embodiment. In FIG. 9, a pixel forming area 22 is shown.

The liquid crystal driving device 100 includes a host processor interface 110, an oscillation circuit 112, a control circuit 114, a common address decoder 116, a common output arithmetic circuit 118, and a common driver 120. Further, the liquid crystal driving device 100 includes a page address control circuit 122, a column address control circuit 124, a line address control circuit 126, an image data RAM 128, an image data latch circuit 130, an MLS decoder 132, and a segment driver 134. The control circuit 114 includes an interlace scanning control circuit 200. A driving section in this embodiment includes the common driver 120 and the segment driver 134, and may further include at least one of the common address decoder 116, the common output arithmetic circuit 118 and the MLS decoder 132.

The host processor interface 110 performs an input interface process for an input signal input from the host processor 30 through an input terminal or an input/output terminal included in the liquid crystal driving device 100. Further, the host processor interface 110 performs an output interface process for an output signal output to the host processor 30 through an output terminal or the input/output terminal included in the liquid crystal driving device 100.

The oscillation circuit 112 generates an oscillation clock OSC which becomes a reference of a display timing signal generated by the liquid crystal driving device 100, by an oscillation operation. For example, the control circuit 114 generates a plurality of types of display timing signals on the basis of the oscillation clock OSC. The control circuit 114 generates a control signal for controlling each section of the liquid crystal driving device 100, such as a common address decoder 116. The interlace scanning control circuit 200 performs a control of repeatedly scanning the common electrodes while interlacing a predetermined number of interlaced lines.

The common address decoder 116 decodes a common address corresponding to a plurality of common electrodes which is generated in the control circuit 114 and simultaneously selected in the MLS driving. The decoding result is output to the common driver 120. The common address is allocated to each of the plurality of common electrodes which is simultaneously selected. By designating the common address when the MLS driving is performed, the corresponding common electrodes are selected.

The common output arithmetic circuit 118 controls the output level of a common output on the basis of field signals F1 and F2 which identify a polarity reversion signal FR and an MLS driving pattern generated in the control circuit 114.

The common driver 120 controls selection or non-selection of the common output on the basis of the decoding result of the common address decoder 116, and outputs the output level generated in the common output arithmetic circuit 118 as the selected common output.

The page address control circuit 122 controls a page address for allowing the image data input from the host processor 30 through the host processor interface 110 to access the image data RAM 128. In the page address, a bus width of the image data input from the host processor 30 is defined as an access unit.

The column address control circuit 124 controls a column address for allowing the image data input from the host processor 30 through the host processor interface 110 to access the image data RAM 128. The column address is defined corresponding to the segment electrode in the pixel forming area 22.

The line address control circuit 126 controls a line address for specifying a reading line among the image data stored in the image data RAM 128. The line address is defined corresponding to the common electrode in the pixel forming area 22.

The image data RAM 128 includes a storage area in which the image data of each pixel is stored, corresponding to arrangement of the pixels in the pixel forming area 22. The storage area is specified by the page address and the column address. Thus, in the image data RAM 128, the image data is written in an area specified by the page address and the column address. On the other hand, the image data is read from the image data RAM 128 in the unit of one line.

The image data latch circuit 130 latches the image data corresponding to one line read from the image data RAM 128.

The MLS decoder 132 decodes the image data and the display timing signal which is generated in the control circuit 114 to perform the MLS driving. More specifically, the MLS decoder 132 controls the output level of a segment output on the basis of the image data which is latched by the image data latch circuit 130 and the polarity reversion signal FR and the field signals F1 and F2 which are generated by the control circuit 114. The decoding result of the MLS decoder 132 is output to the segment driver 134.

The segment driver 134 outputs the output level decoded by the MLS decoder 132 to the segment electrode on the basis of the decoding result of the MLS decoder 132. The segment driver 134 can perform a control of outputting a predetermined output level to the segment electrode, regardless of the decoding result of the MLS decoder 132, by a display OFF signal XDOF generated in the control circuit 114, for displaying OFF. In this embodiment, the output level which is the same electric potential as that of the common electrode is output to the segment electrode by the display OFF signal XDOF, for displaying OFF.

FIG. 10 is a diagram illustrating an example of a selection pattern when the MLS driving method is performed. FIG. 10 illustrates an example of a selection pattern when the polarity reversion signal FR is in an L level. Further, when the polarity reversion signal FR is in an H level, a selection pattern corresponding to voltage applied to each common electrode is also formed every field period.

In the MLS driving method, each field period included in one frame period is specified by the field signals F1 and F2 in the liquid crystal driving device 100. The liquid crystal driving device 100 outputs the voltage V3 or the voltage MV3 to each common electrode, for the respective field periods corresponding to four states expressed by the field signals F1 and F2 of 2 bits shown in FIG. 10. The output pattern to each common electrode in each field period shown in FIG. 10 is defined as a selection pattern by an orthogonal function system. The liquid crystal driving device 100 appropriately selects any one of three types of driving voltages V3, VC and MV3 according to the selection pattern defined by the orthogonal function system which is determined in advance, and respectively applies the selected voltage to the common electrodes which are simultaneously selected.

Each field period is divided into a plurality of sub selection periods allocated to each plurality of common electrodes which are simultaneously selected. Among the plurality of sub selection periods obtained by dividing a first field period (1f), in a sub selection period when common electrodes COM0 to COM3 to be simultaneously selected are selected, the following operation is performed. The liquid crystal driving device 100 selects any one of voltages (V2, V1, VC, MV1 and MV2), and applies the selected voltage to the segment electrode SEG0. At this time, the liquid crystal driving device 100 selects voltage according to the number of polarity discordances between a display pattern and a selection pattern of respective dots corresponding to intersection positions between the segment electrode SEG0 and each of the common electrodes COM0 to COM3 which are simultaneously selected. Similarly, the selected voltage is applied to a different segment electrode.

Next, among the plurality of sub selection periods obtained by dividing the first field period, in a sub selection period when the common electrodes which are to be simultaneously selected next time are selected, the number of discordances in the column of each segment electrode is determined, and then data on the obtained voltage is applied. If the above-described procedure is repeated with respect to all the common electrodes, the operation in the first field period is terminated. Similarly, if the above-described procedure is repeated with respect to a second field period and thereafter, one frame period is terminated, and thus, one screen display is performed.

In the liquid crystal driving device 100 having such a configuration, the common driver 120 scans the common electrodes, over a plurality of fields in a block unit in which a plurality of common electrodes which are simultaneously selected is included in one block, in a selection pattern corresponding to each field. Further, the segment driver 134 drives segment electrodes by the image data corresponding to the plurality of common electrodes which are simultaneously selected and the driving voltages corresponding to the selection pattern. The driving voltages are obtained by the result decoded on the basis of the image data and the display timing signals.

Interlace Scanning

Figure 11:
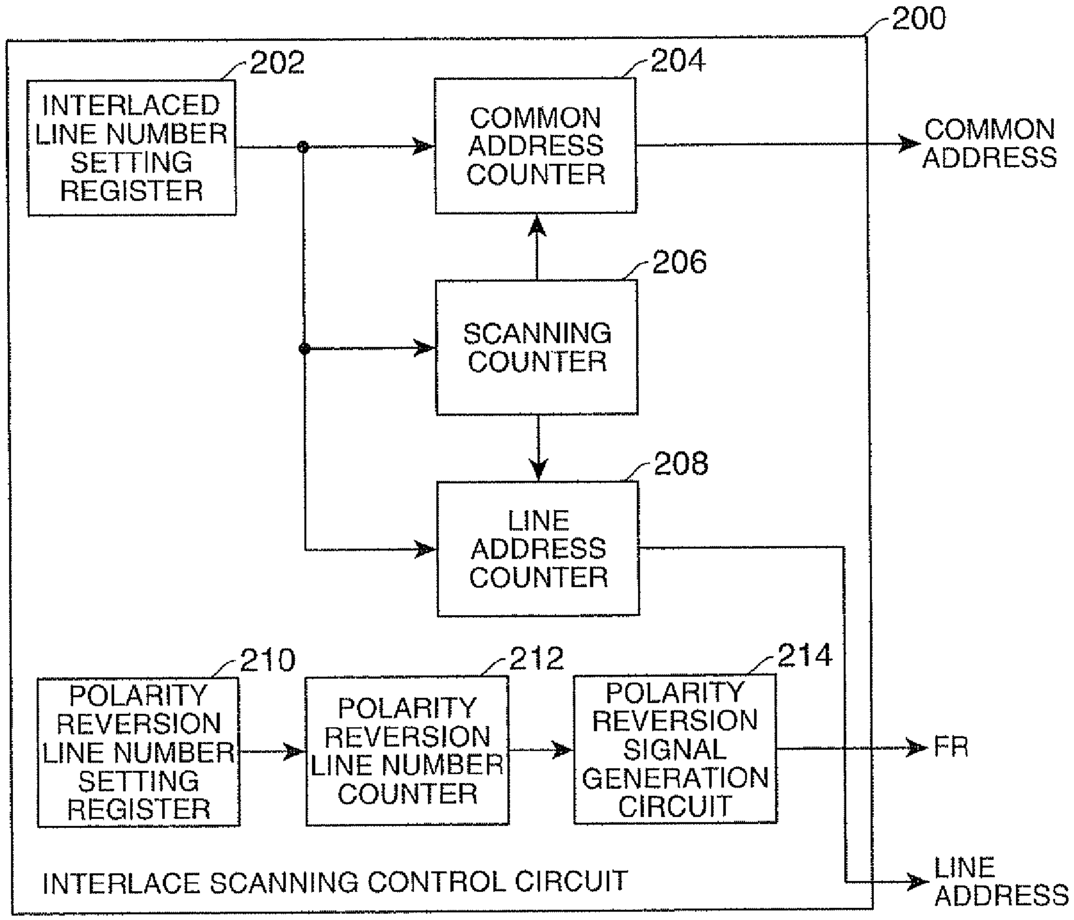
FIG. 11 is a block diagram illustrating a configuration example of an interlace scanning control circuit in FIG. 9.

FIG. 11 is a block diagram illustrating a configuration example of the interlace scanning control circuit 200 in FIG. 9.

The interlace scanning control circuit 200 includes an interlaced line number setting register 202, a common address counter 204, a scanning counter 206, and a line address counter 208. Further, the interlace scanning control circuit 200 includes a polarity reversion line number setting register 210, a polarity reversion line number counter 212, and a polarity reversion signal generation circuit (polarity reversion control section) 214. The interlace scanning control circuit 200 controls the common address, the line address and the polarity reversion signal FR using a vertical sync signal VSYNC, a horizontal sync signal HSYNC and the field signals F1 and F2.

The interlaced line number setting register 202 can be accessed by the host processor 30 through the host processor interface 110, and is set with setting values corresponding to the number of interlaced lines. The interlace scanning control circuit 200 performs a control of scanning the common electrodes COM0 to COMQ while interlacing the number of lines corresponding to the setting values set in the interlaced line number setting register 202. In this embodiment, since the MLS driving method of simultaneously selecting four lines is employed, the interlaced line number setting register 202 is set with setting values corresponding to a multiple of the number of common electrodes which are simultaneously selected. Further, the polarity reversion line number setting register 210 can be accessed by the host processor 30 through the host processor interface 110, and is set with setting values corresponding to the number of polarity reversion lines. The interlace scanning control circuit 200 performs a control of reversing the polarity of a voltage applied to the liquid crystal for each line number corresponding to the setting values set in the polarity reversion line number setting register 210. In this embodiment, since the MLS driving method of simultaneously selecting four lines is employed, the polarity reversion line number setting register 210 is set with setting values corresponding to a multiple of the number of common electrodes which are simultaneously selected.

Here, the outline of the interlace scanning according to this embodiment will be described.

FIG. 12 is a diagram illustrating the interlace scanning according to the present embodiment. In FIG. 12, four common electrodes which are simultaneously selected are represented as a common address, and a selection order of the common addresses during progressive scanning and a selection order of the common addresses during interlace scanning are shown.

In the case of progressive scanning, the common addresses are sequentially incremented from “0”. At this time, if the number of polarity reversion lines is 12 (3 blocks), the polarity reversion is performed when the common addresses “3”, “6”, “9” and so on are selected. On the other hand, in the case of interlace scanning, the common addresses are not sequentially selected from the top. For example, if the number of interlaced lines is (3 blocks), the common addresses are selected in the order of “0”, “4”, “8” and so on. When the common addresses “8”, “9”, “3” and so on are selected, the polarity reversion is performed. In this way, by performing the interlace scanning, the frequency of the electric potential changes of the segment electrodes in a predetermined area (ON or OFF area) is changed, thereby making it possible to prevent image quality deterioration due to crosstalk.

The interlace scanning control circuit 200 which controls the interlace scanning controls the common addresses and the line addresses which specify the common electrodes, to thereby control the interlace scanning with a simple configuration.

Figure 13:
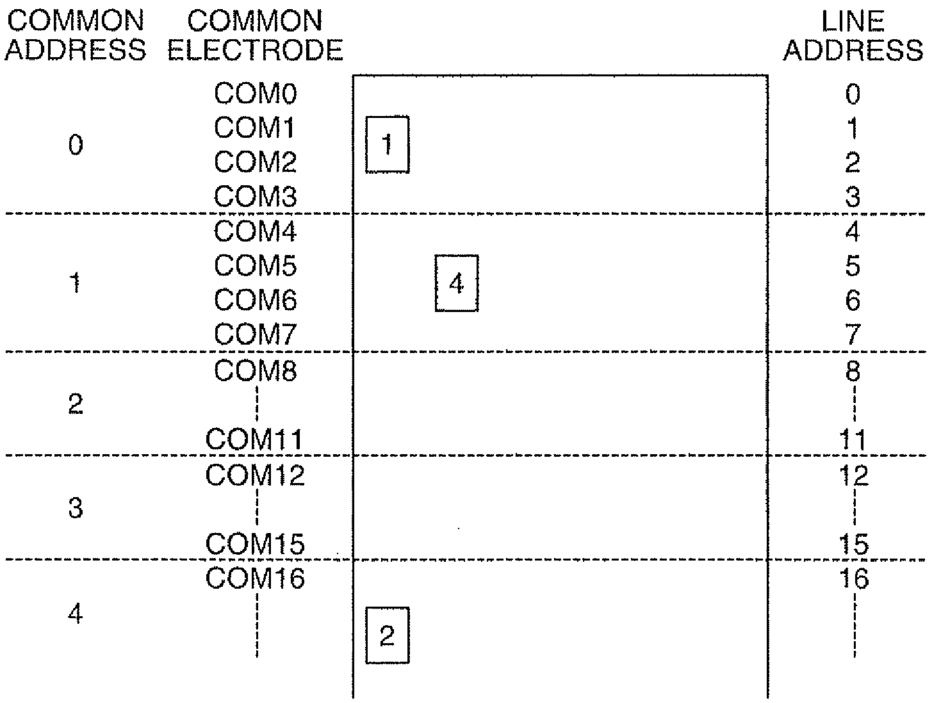
FIG. 13 is a diagram illustrating common addresses and line addresses.

FIG. 13 is a diagram illustrating the common addresses and the line addresses. FIG. 13 shows the common electrodes which are specified by the common addresses and the line addresses corresponding to the common electrodes.

When the interlace scanning control circuit 200 outputs the common address “0”, the common electrodes COM0 to COM3 are simultaneously selected. At this time, among the image data stored in the image data RAM 128, the image data corresponding to the line addresses 0 to 3 are read. For example, if the number of interlaced lines is 12 (3 blocks) as described above, since the common addresses are selected in the order of “0”, “4”, “8” and so on, the interlace scanning control circuit 200 generates the line addresses according to the selection order of the common addresses.

In the interlace scanning control circuit 200, the common address counter 204 counts a common address count value corresponding to the common address which specifies four common electrodes which are simultaneously selected. Further, the line address counter 208 counts line address count values according to the line addresses corresponding to the respective common electrodes which are simultaneously selected. The scanning counter 206 counts a scanning count value indicating what number lap of the interlace scanning is performed. The common address counter 204 generates the common addresses using the scanning count values counted by the scanning counter 206. Further, the line address counter 208 generates the line addresses using the scanning count values counted by the scanning counter 206.

Hereinafter, an operation example of these counters will be described.

Figure 14:
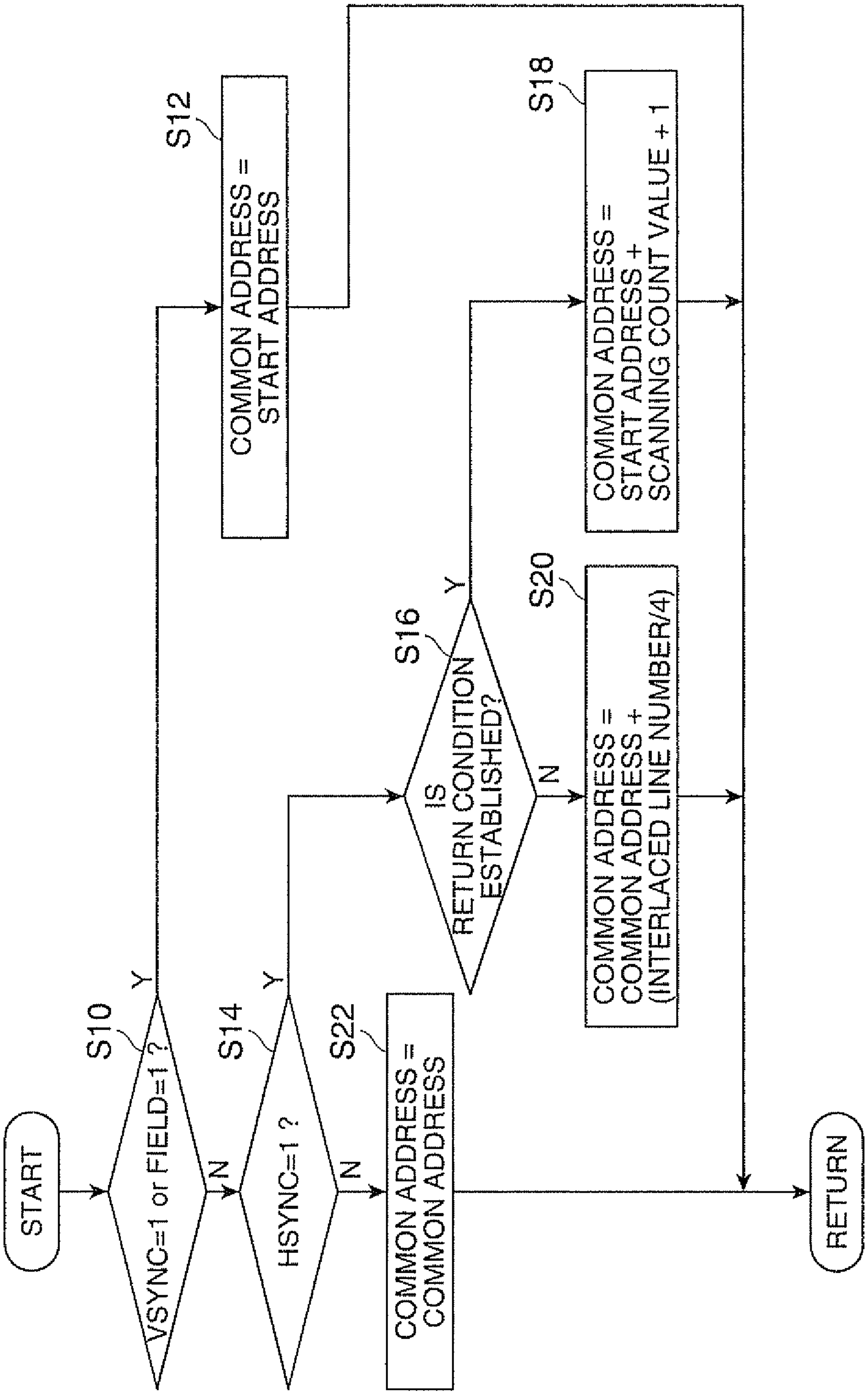
FIG. 14 is a flowchart illustrating an operation example of a common address counter.

FIG. 14 is a flowchart illustrating an operation example of the common address counter 204.

The vertical sync signal VSYNC, the field signals F1 and F2, and the horizontal sync signal HSYNC are input to the common address counter 204. In the common address counter 204, a field head signal FIELD is set to “1” at a start timing of a field period specified on the basis of the field signals F1 and F2. At this time, when the vertical sync signal VSYNC is “1” or the field head signal FIELD is “1” (Y in step S10), the common address counter 204 sets a start address “0” as the common address (step S12). More specifically, the common address counter 204 sets “0” as the common address count value.

On the other hand, when the vertical sync signal VSYNC is not "1" and the field head signal FIELD is not "1" (N in step S10), the common address counter 204 determines updating of the common address count value on the basis of the horizontal sync signal HSYNC (step S14). In step S14, when the horizontal sync signal HSYNC is "1" (Y in step S14), the common address counter 204 determines a return condition of the common address count value (step S16). If the return condition of step S16 is established, the common address counter 204 determines that the first lap of the scanning of the common electrodes which are interlaced by the number of interlaced lines is terminated, and then updates the second lap of the common addresses. The return condition of step S16 is "common address count value≥((the number of display lines/4)−(the number of interlaced lines/4))−1".

When the return condition of step S16 is established (Y in step S16), the common address counter 204 sets "start address+scanning count value+1" as the common address count value. The scanning count value is a count value updated according to the number of interlaced lines in the scanning counter 206 as described later. On the other hand, when the return condition of step S16 is not established (N in step S16), the common address counter 204 sets "common address count value+(the number of interlaced lines)/4" as the common address count value, and sets "common address+(the number of interlaced lines)/4" as the common address (step S20). Thus, as long as the return condition is not established, whenever the horizontal sync signal HSYNC becomes "1", the common address count value is increased by the amount of "the number of interlaced lines/4" (=the number of simultaneous selection blocks).

In step S14, when the horizontal sync signal HSYNC is not "1" (N in step S14), the common address counter 204 does not update the common address count value (step S22), and then the routine returns to step S10. After the processes of steps S18 and S20, similarly, the routine returns to step S10.

The common driver (common electrode driving section) 120 which receives the common address corresponding to the common address count value counted as described above performs the interlace scanning for the common electrodes of the pixel forming area 22.

Figure 15:
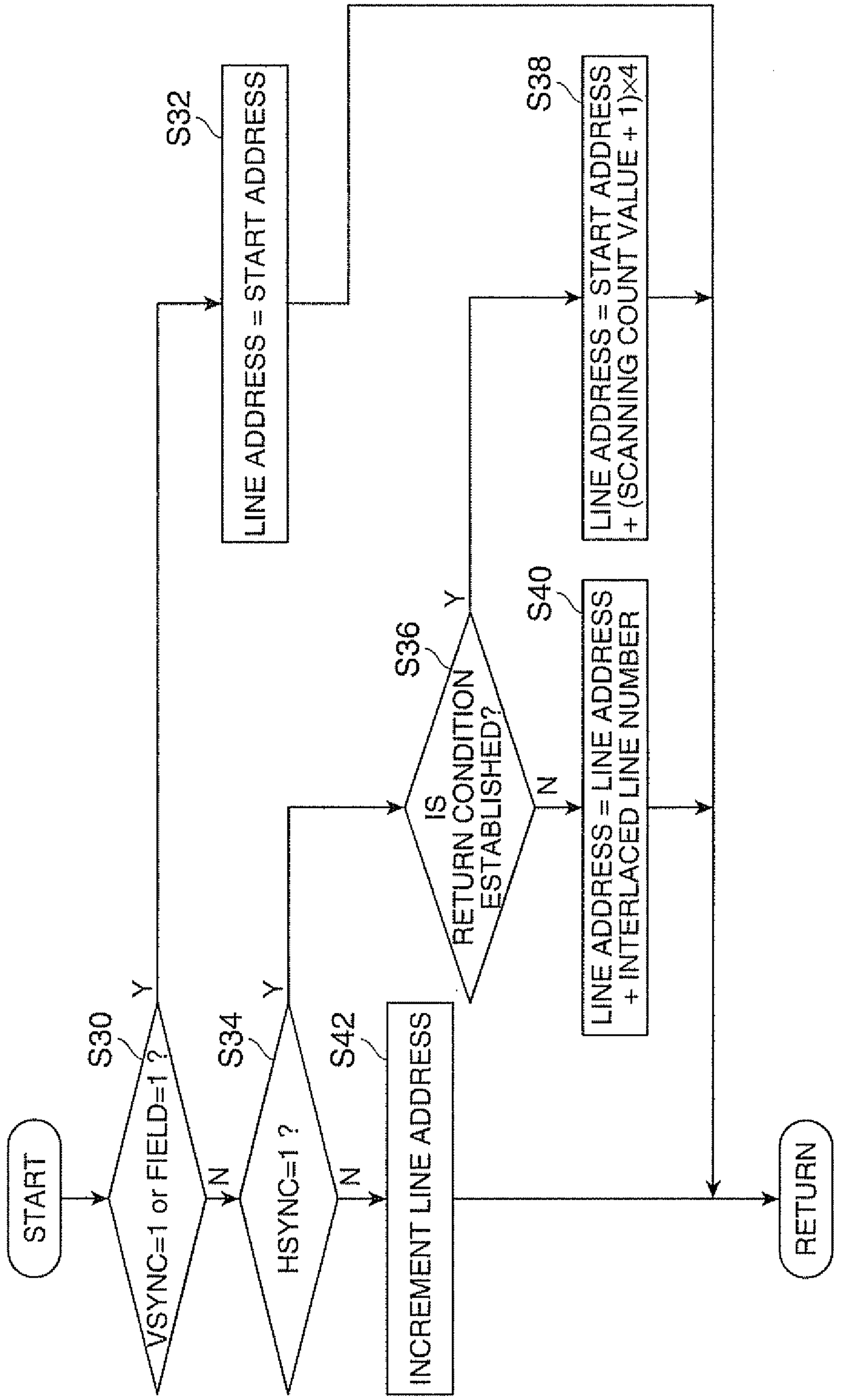
FIG. 15 is a flowchart illustrating an operation example of a line address counter.

FIG. 15 is a flowchart illustrating an operation example of the line address counter 208.

The vertical sync signal VSYNC, the field signals F1 and F2, and the horizontal sync signal HSYNC are input to the line address counter 208. When the vertical sync signal VSYNC is "1" or the field head signal FIELD is "1" (Y in step S30), the line address counter 208 sets the line address to "0" as a start address (step S32). More specifically, the line address counter 208 sets "0" as the line address count value.

On the other hand, when the vertical sync signal VSYNC is not "1" and the field head signal FIELD is not "1" (N in step S30), the line address counter 208 determines updating of the line address count value on the basis of the horizontal sync signal HSYNC (step S34). In step S34, when the horizontal sync signal HSYNC is "1" (Y in step S34), the line address counter 208 determines a return condition of the line address count value (step S36). If the return condition of step S36 is established, the line address counter 208 determines that the first lap of the scanning of the common electrodes which are interlaced by the number of interlaced lines is terminated, and then updates the second lap of the line addresses. The return condition of step S36 is "line address count value≥((the number of display lines−the number of interlaced lines)−1".

When the return condition of step S36 is established (Y in step S36), the line address counter 208 sets "start address+(scanning count value+1)×4" as the line address count value (step S38). On the other hand, when the return condition of step S36 is not established (N in step S36), the line address counter 208 sets "line address count value+the number of interlaced lines" as the line address count value, and sets "line address+the number of interlaced lines" as the line address (step S40). Thus, as long as the return condition is not established, whenever the horizontal sync signal HSYNC becomes "1", the line address count value is increased by the amount of "the number of interlaced lines".

In step S34, when the horizontal sync signal HSYNC is not "1" (N in step S34), the line address counter 208 increments the line address count value (step S42), and then the routine returns to step S30. After the processes of steps S38 and S40, similarly, the routine returns to step S30.

The segment driver (segment electrode driving section) 134 drives the segment electrodes in the pixel forming area 22, on the basis of the image data read using the line address corresponding to the line address count value counted as described above.

Figure 16:
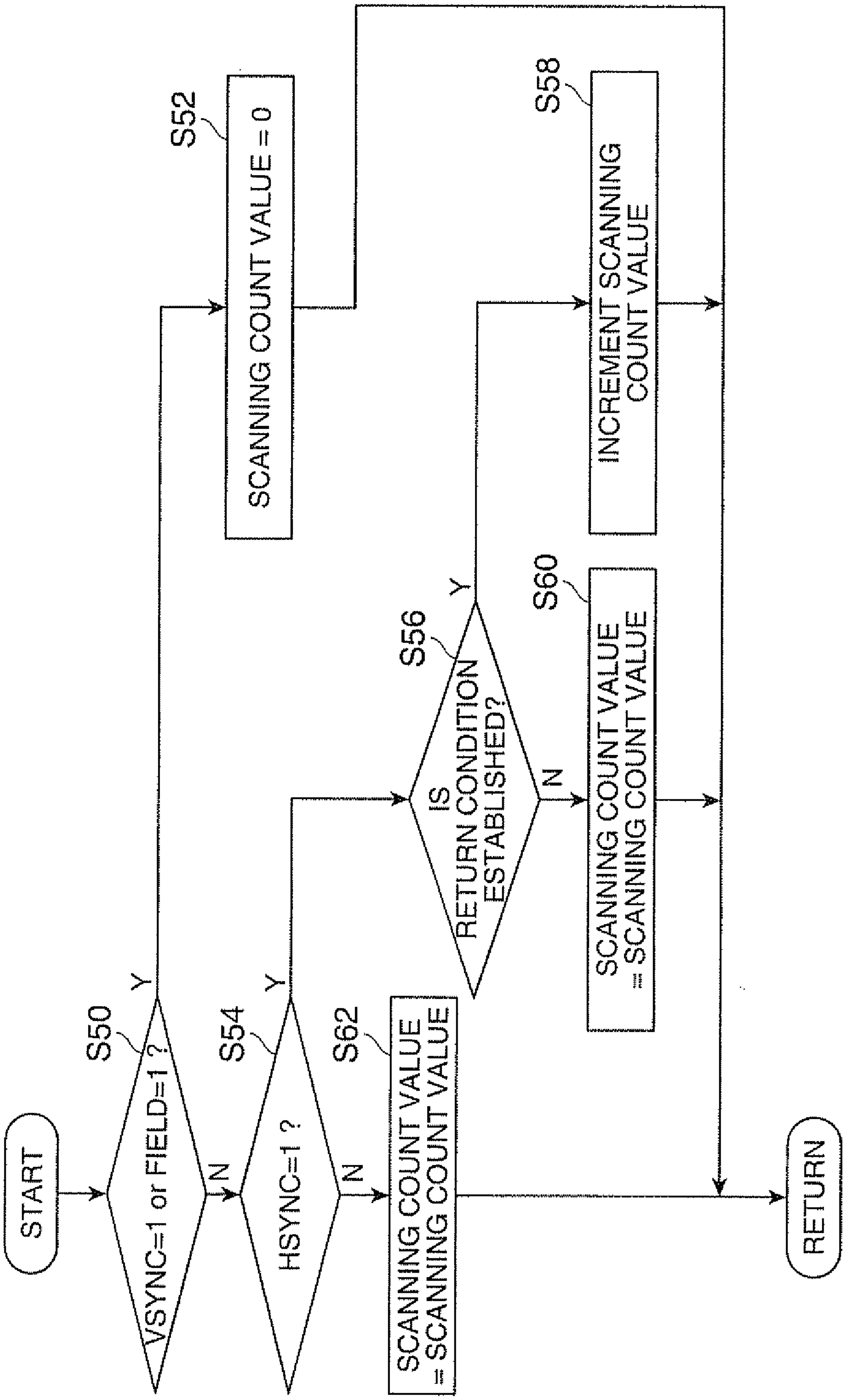
FIG. 16 is a flowchart illustrating an operation example of a scanning counter.

FIG. 16 is a flowchart illustrating an operation example of the scanning counter 206.

The vertical sync signal VSYNC, the field signals F1 and F2, and the horizontal sync signal HSYNC are input to the scanning counter 206. When the vertical sync signal VSYNC is "1" or the field head signal FIELD is "1" (Y in step S50), the scanning counter 206 sets "0" as the scanning count value (step S52).

On the other hand, when the vertical sync signal VSYNC is not "1" and the field head signal FIELD is not "1" (N in step S50), the scanning counter 206 determines updating of the scanning count value on the basis of the horizontal sync signal HSYNC (step S54). In step S54, when the horizontal sync signal HSYNC is "1" (Y in step S54), the scanning counter 206 determines a return condition of the scanning count value (step S56). If the return condition of step S56 is established, the scanning counter 206 determines that the first lap of the scanning of the common electrodes which are interlaced by the number of interlaced lines is terminated, and then updates the second lap of the common addresses. The return condition of step S56 corresponds to a case where the return condition of the step S16 in FIG. 14 and the return condition of step S36 in FIG. 15 are established.

When the return condition of step S56 is established (Y in step S56), the scanning counter 206 increments the scanning count value (S58), and then the routine returns to step S50. On the other hand, when the return condition of step S56 is not established (N in step S56), the scanning counter 206 updates the scanning count value (step S60), and then the routine returns to step S50.

In step S54, when the horizontal sync signal HSYNC is not "1" (N in step S54), the scanning counter 206 does not update the scanning count value (step S62), and then the routine returns to step S50.

As described above, the interlace scanning control circuit 200 updates the common address according to the setting value corresponding to the number of interlaced lines set in the interlaced line number setting register 202, and accordingly updates the line address. As a result, the common driver 120 can scan the common electrodes while interlacing every number of interlaced lines corresponding to the setting value of the interlaced line number setting register 202.

On the other hand, in FIG. 11, the polarity reversion line number counter 212 counts a polarity reversion line number count value on the basis of the number of polarity reversion lines corresponding to a setting value set in the polarity reversion line number setting register 210. The polarity reversion signal generation circuit 214 outputs the polarity reversion signal FR by reversing a logic level for each number of the polarity reversion lines, on the basis of the polarity reversion line number count value. Thus, the polarity reversion signal generation circuit 214 can perform a control of reversing the voltage polarity between the common electrodes and the segment electrodes, every predetermined number of polarity reversion lines.

Figure 17:
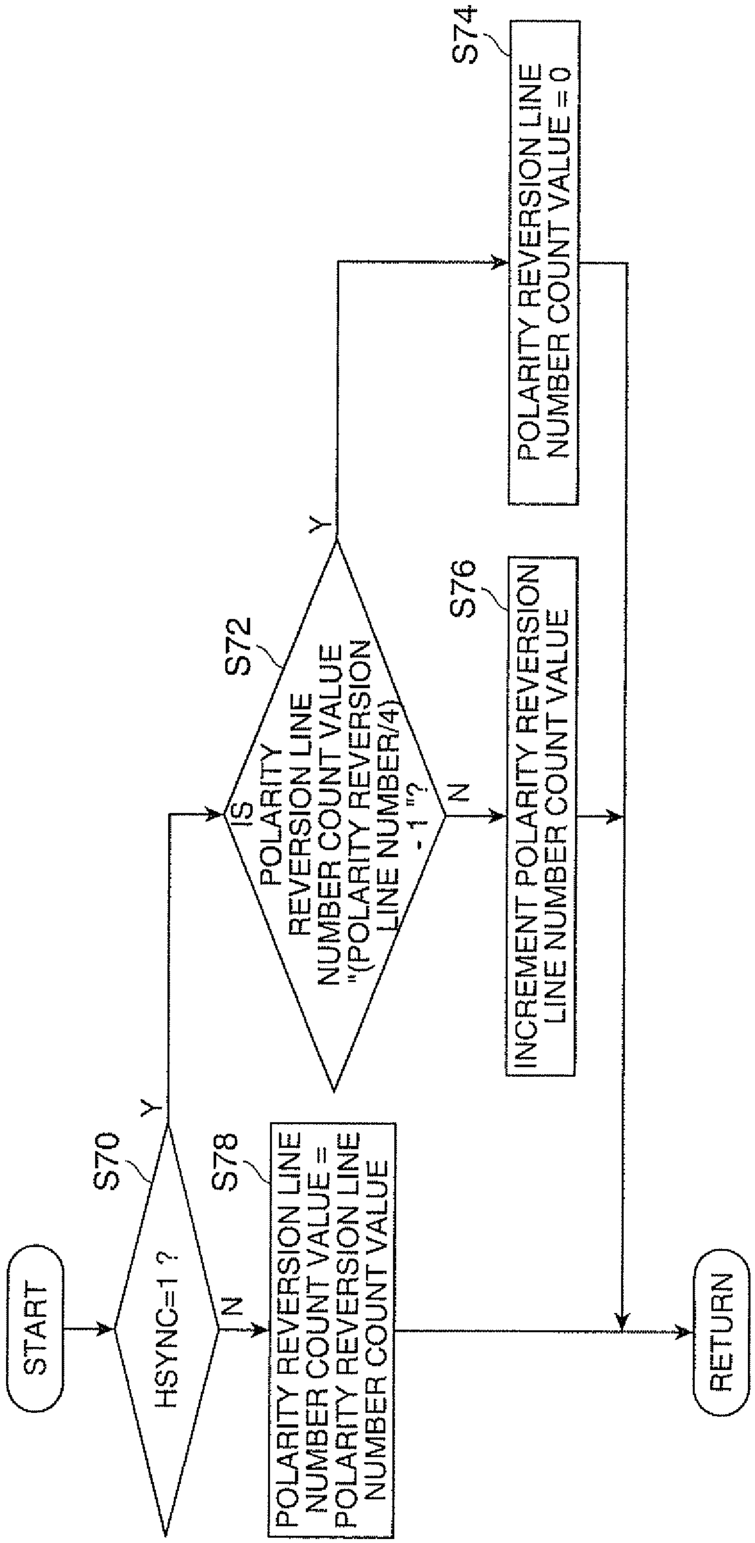
FIG. 17 is a flowchart illustrating an operation example of a polarity reversion line number counter.

FIG. 17 is a flowchart illustrating an operation example of the polarity reversion line number counter 212.

The horizontal sync signal HSYNC is input to the polarity reversion line number counter 212. When the horizontal sync signal HSYNC is "1" (Y in step S70), the polarity reversion line number counter 212 determines whether the polarity reversion line number count value is (the number of polarity reversion lines/4−1) (step S72). When it is determined in step S72 that the polarity reversion line number count value is (the number of polarity reversion lines/4−1) (Y in step S72), the polarity reversion line number counter 212 initializes the polarity reversion line number count value (step S74). Thereafter, the routine returns to step S70. On the other hand, in step S72, when it is determined in step S72 that the polarity reversion line number count value is not (the number of polarity reversion lines/4−1) (N in step S72), the polarity reversion line number counter 212 increments the polarity reversion line number count value (step S76). Then, the routine returns to step S70.

In step S70, when the horizontal sync signal HSYNC is not "1" (N in step S70), the polarity reversion line number counter 212 does not update the polarity reversion line number count value (step S78), and then the routine returns to step S70.

Figure 18:
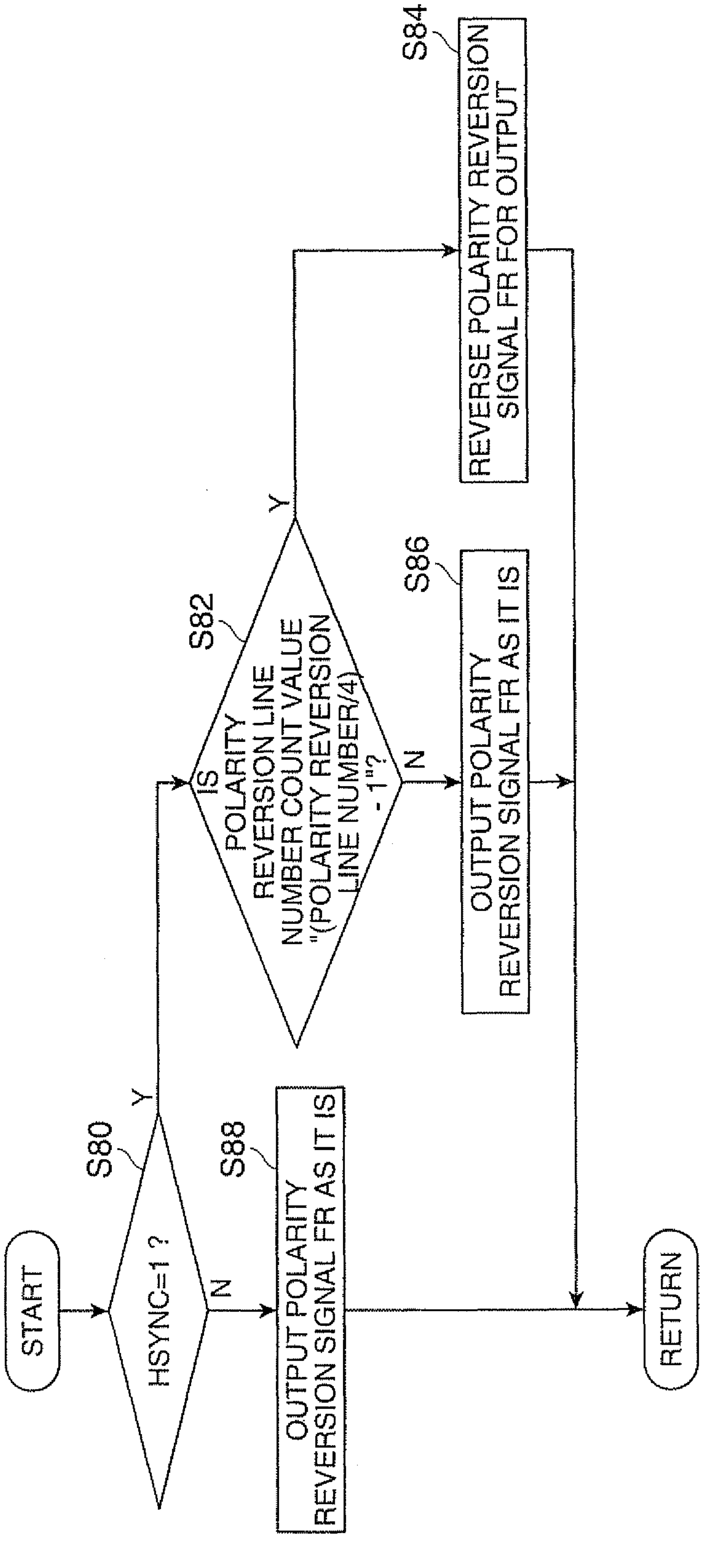
FIG. 18 is a flowchart illustrating an operation example of a polarity reversion signal generation circuit.

FIG. 18 is a flowchart illustrating an operation example of the polarity reversion signal generation circuit 214.

The horizontal sync signal HSYNC is input to the polarity reversion signal generation circuit 214. When the horizontal sync signal HSYNC is "1" (Y in step S80), the polarity reversion signal generation circuit 214 determines whether the polarity reversion line number count value is (the number of polarity reversion lines/4−1) (step S82). When it is determined in step S82 that the polarity reversion line number count value is (the number of polarity reversion lines/4−1) (Y in step S82), the polarity reversion signal generation circuit 214 reverses a logic level of the polarity reversion signal FR to be output (step S84). Thereafter, the routine returns to step S80. On the other hand, in step S82, when it is determined that the polarity reversion line number count value is not (the number of polarity reversion lines/4−1) (N in step S82), the polarity reversion signal generation circuit 214 does not change the logic level of the polarity reversion signal FR (step S86). Then, the routine returns to step S80.

In step S80, when the horizontal sync signal HSYNC is not "1" (N in step S80), the polarity reversion signal generation circuit 214 does not change the logic level of the polarity reversion signal FR (step S88), and then the routine returns to step S80.

Each section of the interlace scanning control circuit 200 with the configuration shown in FIG. 11 is operated as shown in FIGS. 14 to 18, and thus, various signals or count values inside thereof are changed as follows.

Figure 19:
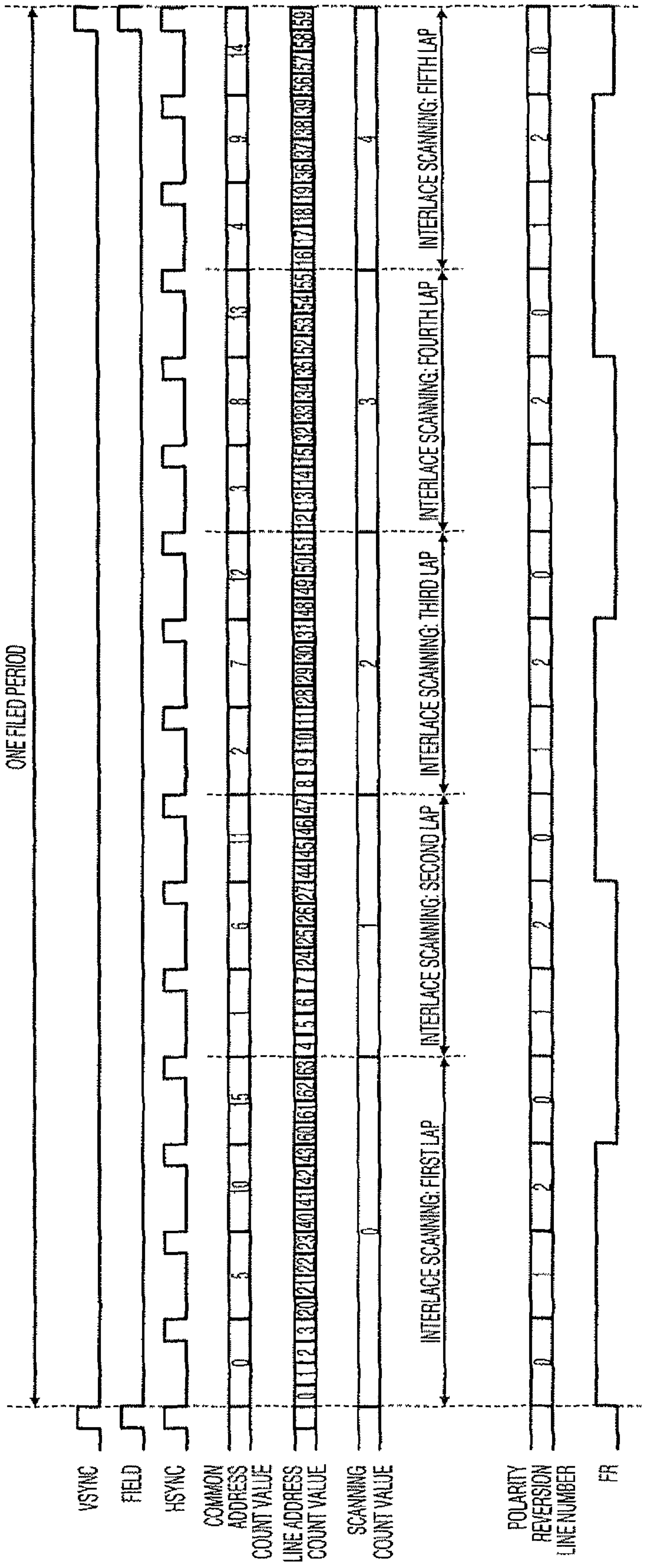
FIG. 19 is a timing diagram of an operation example of an interlace scanning control circuit.

FIG. 19 is a timing diagram of an operation example of the interlace scanning control circuit 200, which represents timings corresponding to one field period. In FIG. 19, the number of display lines is "64", the number of interlaced lines is "16" (four blocks), and the number of polarity reversion lines is "12" (three blocks).

As shown in FIG. 19, if the vertical sync signal VSYNC becomes "1", each field period obtained by dividing one vertical scanning period starts. In each field period, one horizontal scanning period starts when the horizontal sync signal HSYNC becomes "1". The common address count value is updated as "0", "5", "10" and "15" during every one horizontal scanning period. For example, when the common address count value is "0", the common electrodes COM0 to COM3 corresponding to the common address "0" are selected, as shown in FIG. 13. Similarly, for example, when the common address count value is "5", the common electrodes COM20 to COM23 corresponding to the common address "5" are selected. When the horizontal sync signal HSYNC is "1" and the common address count value is "11 (=((64/4)−(16/4))−1)" or more, the return condition is established, and the common address count value returns to approximately "0" (refer to step S16 in FIG. 14). Here, the common address count value is again updated in the order of "1", "6", and so on from "start address+scanning count value+1".

The line address count value is updated four times with respect to one common address count value. When the horizontal sync signal HSYNC is "1" and the line address count value is "47 (=(64−16)/4−1)" or more, the return condition is established, and the line address count value returns to approximately "0" (refer to step S36 in FIG. 15). Here, the line address count value is again updated from "start address+(scanning count value+1)×4".

When the return condition of step S56 in FIG. 16 is established, the scanning count value terminates the first lap of interlace scanning. At this time, the scanning count value is incremented.

Further, the polarity reversion line number count value is increased for every one horizontal scanning period, and is set to "0" when the condition of step S72 in FIG. 17 is established. When the polarity reversion line number count value is ((the number of polarity reversion lines/4)−1), the polarity reversion signal generation circuit 214 reverses a logic level of the polarity reversion signal FR.

Accordingly, in FIG. 19, when the number of polarity reversion lines is "12", and when the polarity reversion line number count value becomes "2", the polarity reversion signal generation circuit 214 reverses the logic level of the polarity reversion signal FR. In this way, the polarity reversion signal FR is level H in the common address count values of "0", "5" and "10", and the polarity reversion signal FR is level L in the common address count values of "15", "1", and "6". Thereafter, the polarity reversion signal FR is level H in the common address count values of "11", "2" and "7". Similarly, the same pattern is repeated thereafter.

Figure 20:
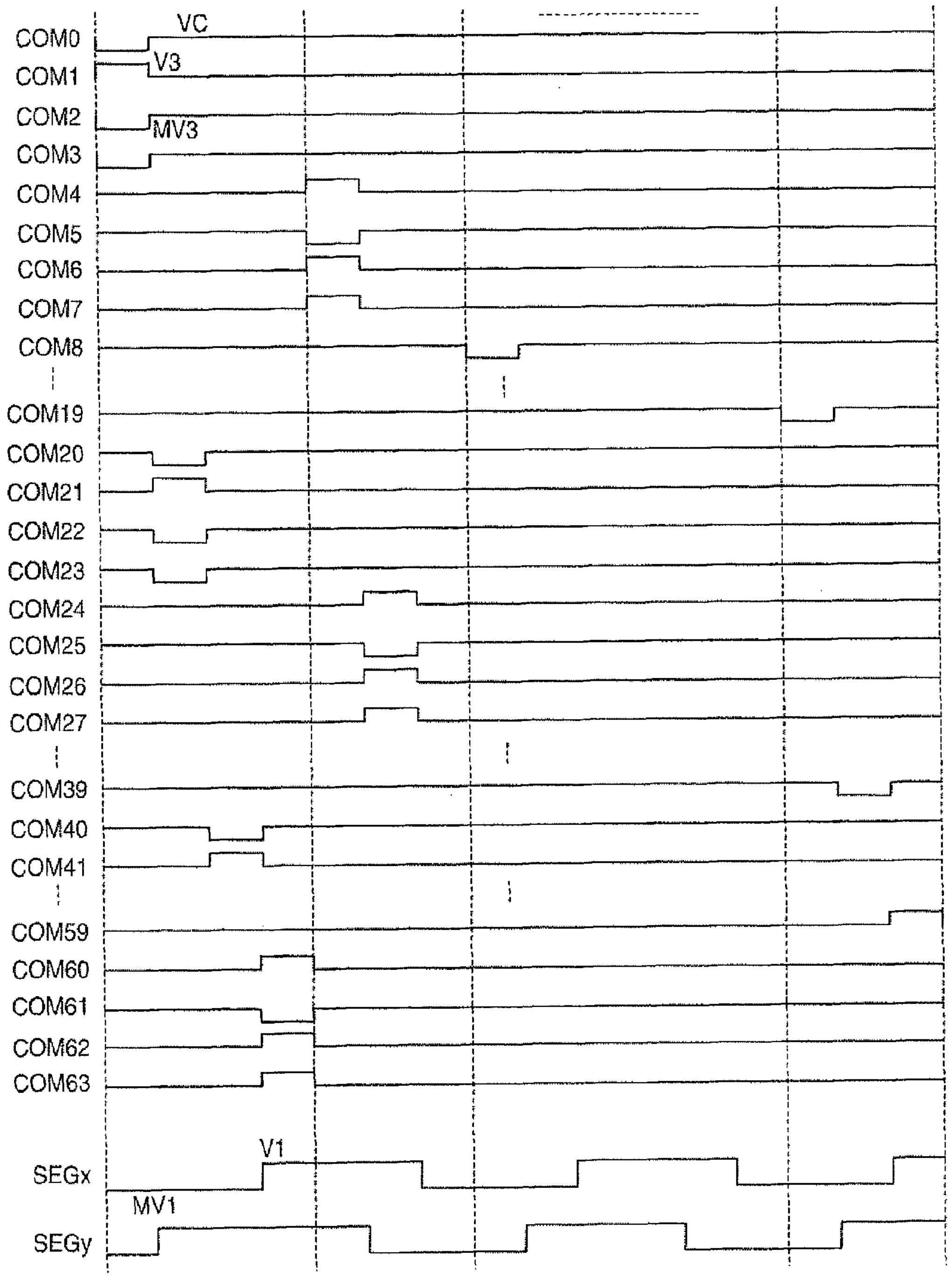
FIG. 20 is a diagram illustrating an example of a driving timing of a liquid crystal driving device according to the present embodiment.

FIG. 20 is a diagram illustrating an example of a driving timing of the liquid crystal driving device 100 according to the present embodiment. In FIG. 20, the number of display lines is "64", the number of interlaced lines is "16", and the number of polarity reversion lines is "12". The driving timing in FIG. 20 is shown corresponding to the field period in FIG. 19.

As shown in FIG. 20, four common electrodes are simultaneously selected while being interlaced every four blocks, and selection voltages according to the selection pattern are supplied. Specifically, after the common electrodes COM0 to COM3 corresponding to the common address "0" are simultaneously selected, the common electrodes COM20 to COM23 corresponding to the common address "5" are simultaneously selected while being interlaced by four blocks. Similarly, the common electrode scanning is repeated while interlacing four blocks, and common electrodes COM60 to COM63 corresponding to a common address "15" are simultaneously selected, and thereafter the first lap of interlace scanning is terminated. Then, common electrodes COM4 to COM7 corresponding to the common address “1” are simultaneously selected, and the second lap of interlace scanning is similarly performed.

As described above, in this embodiment, the common electrodes can be scanned by the interlace scanning. Thus, by changing the number of interlaced lines and the number of polarity reversion lines, it is possible to easily adjust the change in effective voltages due to crosstalk. Further, with the interlace scanning, it is possible to realize the adjustment of effective voltages according to the change in the scanning order, with a simple configuration.

Electronic Apparatus

The liquid crystal driving device 100, or the liquid crystal display panel 20 or the liquid crystal display system 10 to which the liquid crystal driving device 100 is applied can be applied to the following electronic apparatuses.

Figure 21A:
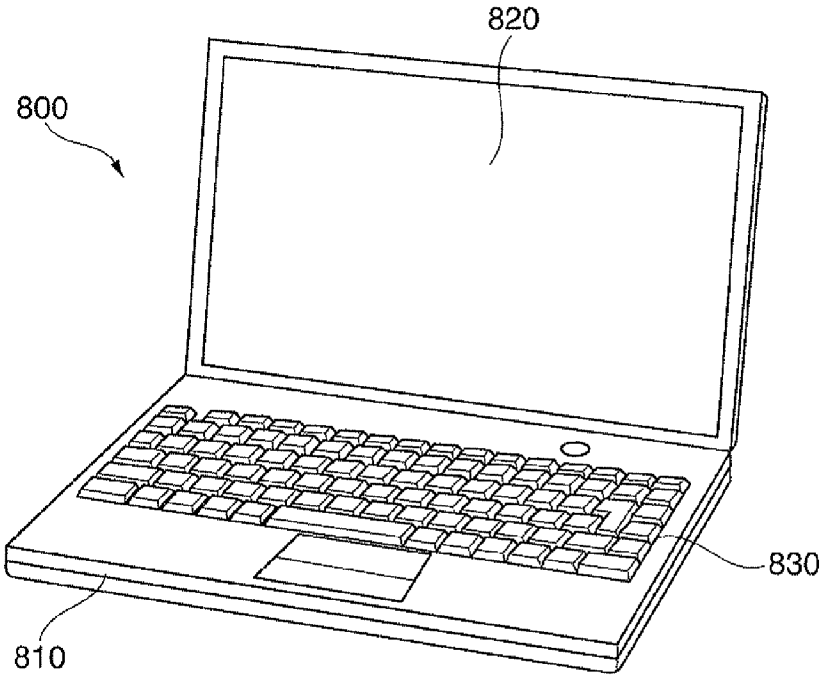
FIGS. 21A and 21B are perspective views illustrating configurations of electronic apparatuses according to the present embodiment.
Figure 21B:
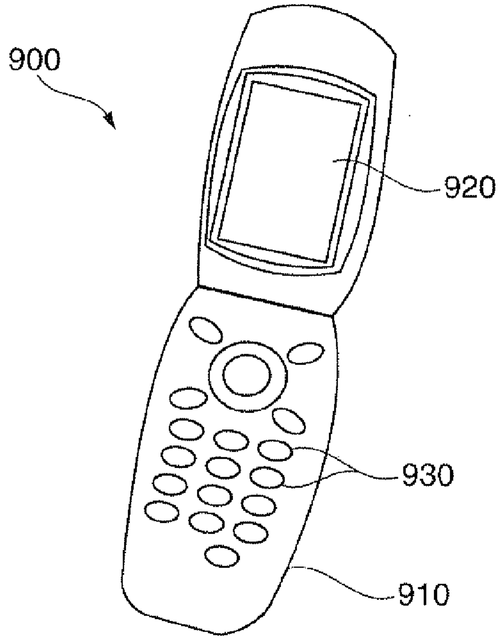

FIGS. 21A and 21B are perspective views illustrating configurations of electronic apparatuses according to an embodiment. FIG. 21A is the perspective view illustrating the configuration of a mobile personal computer, and FIG. 21B is the perspective view of the configuration of a mobile phone.

A personal computer 800 shown in FIG. 21A includes a main body 810 and a display section 820. The liquid crystal panel 20 or the liquid crystal display system 10 according to this embodiment is used as the display section 820. The main body 810 includes a host processor, and a keyboard 830 is installed in the main body 810. That is, the personal computer 800 includes at least the liquid crystal driving device 100 according to this embodiment. Operation information input through the keyboard 830 is analyzed by the host processor, and an image is displayed on the display section 820 according to the operation information.

A mobile phone 900 shown in FIG. 21B includes a main body 910 and a display section 920. The liquid crystal panel 20 or the liquid crystal display system 10 according to this embodiment is used as the display section 920. The main body 910 includes a host processor, and a keyboard 930 is installed in the main body 910. That is, the personal computer 900 includes the liquid crystal driving device 100 according to this embodiment. Operation information input through the keyboard 930 is analyzed by the host processor, and an image is displayed on the display section 920 according to the operation information.

The electronic apparatus according to the embodiment is not limited to those shown in FIGS. 21A and 21B. For example, the electronic apparatus may include a PDA (Personal Digital Assistant), a digital still camera, a television, a video camera, a car navigation device, a pager, an electronic diary, an electronic paper, an electronic calculator, a word processor, a workstation, a television telephone, a POS (point of sale system) terminal, a printer, a scanner, a copier, a video player, and a device having a touch panel.

Hereinbefore, the liquid crystal driving device, the liquid crystal display apparatus, the electronic apparatus, the liquid crystal driving method and the like according to the invention have been described on the basis of the embodiments, but the invention is not limited to the above-described embodiments. For example, a variety of modifications may be made in a range without departing from the scope of the invention, and is exemplified as follows.

(1) In the above embodiments, the liquid crystal driving device uses the MLS driving method, but is not limited thereto.

(2) In the above embodiments, the invention is described as the liquid crystal driving device, the liquid crystal display apparatus, the electronic apparatus, the liquid crystal driving method and the like, but is not limited thereto.

What is claimed is:

1. A liquid crystal driving device which drives a passive liquid crystal display apparatus, comprising:

a common electrode driving section which scans a common electrode of the liquid crystal display apparatus while interlacing every predetermined number of interlaced lines, the predetermined number of interlaced lines being a natural number greater than one;

a segment electrode driving section which drives a segment electrode of the liquid crystal display apparatus on the basis of image data corresponding to the common electrode scanned by the common electrode driving section; and a polarity reversion control section which performs control for reversing polarity of a voltage between the common electrode scanned by the common electrode driving section and the segment electrode driven by the segment electrode driving section, every predetermined number of polarity reversion lines, the predetermined number of polarity reversion lines being a natural number greater than one, the polarity reversion control section outputting a polarity reversion signal on the basis of the predetermined number of polarity reversion lines, the common electrode driving section reversing a polarity of a common voltage of the common electrode based on the polarity reversion signal, the reversing of the polarity of the common voltage performed with a non-constant interval of a common address corresponding to the common electrode, and the segment electrode driving section driving a segment voltage of the segment electrode such that the segment voltage is changed based on the image data and the polarity reversion signal.

2. The liquid crystal driving device according to claim 1, further comprising a polarity reversion line number setting register in which a setting value corresponding to the polarity reversion line number is set, wherein the common electrode driving section scans the common electrode using a selection voltage of which the polarity is reversed every polarity reversion line number corresponding to the setting value of the polarity reversion line number setting register, and wherein the segment electrode driving section drives the segment electrode using a driving voltage of which the polarity is reversed every polarity reversion line number corresponding to the setting value of the polarity reversion line number setting register.

3. The liquid crystal driving device according to claim 1, wherein the common electrode driving section scans the common electrode of the liquid crystal display apparatus, over a plurality of fields in a block unit in which a plurality of common electrodes selected at the same time belongs to one block, in a selection pattern corresponding to the respective fields, wherein the segment electrode driving section drives the segment electrode at a driving voltage corresponding to image data corresponding to the plurality of common electrodes selected at the same time and a driving voltage corresponding to the selection pattern, wherein the interlaced line number is a multiple of the number of the plurality of common electrodes selected at the same time, and wherein the polarity reversion line number is a multiple of the number of the plurality of common electrodes selected at the same time.

4. The liquid crystal driving device according to claim 1, further comprising:

a scanning counter which counts the frequency of interlace scanning; and a common address counter which counts the common address corresponding to the common electrode which is a scanning target, using the counted value of the scanning counter, wherein the common electrode driving section scans the common electrode corresponding to the common address.

5. A liquid crystal display apparatus comprising:

a plurality of common electrodes;

a plurality of segment electrodes which intersects the plurality of common electrodes; and the liquid crystal driving device which scans the plurality of common electrodes and drives the plurality of segment electrodes, according to claim 1.

6. A liquid crystal display apparatus comprising:

a plurality of common electrodes;

a plurality of segment electrodes which intersects the plurality of common electrodes; and the liquid crystal driving device which scans the plurality of common electrodes and drives the plurality of segment electrodes, according to claim 2.

7. A liquid crystal display apparatus comprising:

a plurality of common electrodes;

a plurality of segment electrodes which intersects the plurality of common electrodes; and the liquid crystal driving device which scans the plurality of common electrodes and drives the plurality of segment electrodes, according to claim 3.

8. A liquid crystal display apparatus comprising:

a plurality of common electrodes;

a plurality of segment electrodes which intersects the plurality of common electrodes; and the liquid crystal driving device which scans the plurality of common electrodes and drives the plurality of segment electrodes, according to claim 4.

9. An electronic apparatus comprising the liquid crystal display apparatus according to claim 5.

10. A liquid crystal driving method of driving a passive liquid crystal display apparatus, comprising:

setting an interlaced line number into an interlaced line number setting register;

scanning a common electrode of the liquid crystal display apparatus while interlacing every predetermined number of interlaced lines corresponding to the interlaced line number, the predetermined number of interlaced lines being a natural number greater than one;

driving a segment electrode of the liquid crystal display apparatus on the basis of image data corresponding to the common electrode;

performing control for reversing polarity of a voltage between the common electrode scanned by a common electrode driving section and the segment electrode driven by a segment electrode driving section, every predetermined number of polarity reversion lines, the predetermined number of polarity reversion lines being a natural number greater than one;

outputting a polarity reversion signal on the basis of the predetermined number of polarity reversion lines;

reversing a polarity of a common voltage of the common electrode based on the polarity reversion signal, the reversing of the polarity of the common voltage performed with a non-constant interval of a common address corresponding to the common electrode; and driving a segment voltage of the segment electrode such that the segment voltage is changed based on the image data and the polarity reversion signal.

11. The liquid crystal driving device according to claim 1, wherein the predetermined number of interlaced lines is not equal to the predetermined number of polarity reversion lines.

12. The liquid crystal driving method of driving a passive liquid crystal display apparatus according to claim 10, wherein the predetermined number of interlaced lines is not equal to the predetermined number of polarity reversion lines.

13. The liquid crystal driving device according to claim 1, further comprising an interlaced line number setting register in which a setting value corresponding to the interlaced line number is set, wherein the common electrode driving section scans the common electrode of the liquid crystal display apparatus while interlacing every predetermined number of interlaced lines corresponding to the setting value of the interlaced line number setting register.

* * * * *